(12) United States Patent
Yoshida et al.

(10) Patent No.: US 9,588,390 B2
(45) Date of Patent: Mar. 7, 2017

(54) LIQUID CRYSTAL DISPLAY DEVICE

(71) Applicant: Sharp Kabushiki Kaisha, Osaka (JP)

(72) Inventors: Masahiro Yoshida, Osaka (JP); Kunihiro Tashiro, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/482,497

(22) Filed: Sep. 10, 2014

(65) Prior Publication Data
US 2014/0375918 A1 Dec. 25, 2014

Related U.S. Application Data

(63) Continuation of application No. 13/392,235, filed as application No. PCT/JP2010/063994 on Aug. 19, 2010, now Pat. No. 8,854,581.

(30) Foreign Application Priority Data

Aug. 24, 2009 (JP) ................................ 2009-193459

(51) Int. Cl.
*G02F 1/1337* (2006.01)
*G02F 1/1362* (2006.01)
(Continued)

(52) U.S. Cl.
CPC ........ *G02F 1/136286* (2013.01); *G02F 1/137* (2013.01); *G02F 1/1337* (2013.01);
(Continued)

(58) Field of Classification Search
CPC ........... G02F 1/13394; G02F 1/134336; G02F 1/133707
See application file for complete search history.

(56) References Cited

U.S. PATENT DOCUMENTS 6,661,488 B1 12/2003 Sasabayashi et al.
6,816,210 B2 * 11/2004 Chen ................. G02F 1/134336
349/110

(Continued)

FOREIGN PATENT DOCUMENTS

EP 2 287 658 A1 2/2011
JP 11-242225 9/1999
(Continued)

OTHER PUBLICATIONS

English Translation of International Preliminary Report on Patentability and Written Opinion issued in Application Serial No. PCT/JP2010/063994 dated Mar. 13, 2012.
(Continued)

*Primary Examiner* — Kendrick Hsu
(74) *Attorney, Agent, or Firm* — Nixon & Vanderhye P.C.

(57) ABSTRACT

The present invention has an object of providing a liquid crystal display device having a high transmittance or a high viewing angle characteristic. A liquid crystal display device according to the present invention includes a pixel electrode (30) including a peripheral portion (36), an island portion (32) and a plurality of branch portions (34). The plurality of branch portions (34) are formed of a plurality of first through fourth branch portions (34A through 34D) respectively extending in first through fourth directions. By these branch portions, first through fourth regions (35A through 35D) in which liquid crystal molecules are aligned in different directions from each other at the time of voltage application are formed. The island portion (32) is surrounded by the first through fourth regions (35A through 35D), and is connected to the peripheral portion (36) by a connection portion (38) but not by any of the plurality of branch portions (34) or connected to the peripheral portion (36) by one of the first through fourth branch portions (34A through 34D).

10 Claims, 32 Drawing Sheets

(51) Int. Cl.
  *G02F 1/1343*   (2006.01)
  *G02F 1/139*    (2006.01)
  *G02F 1/1333*   (2006.01)
  *G02F 1/1335*   (2006.01)
  *G02F 1/137*    (2006.01)
  *G02F 1/1339*   (2006.01)

(52) U.S. Cl.
  CPC ...... *G02F 1/1393* (2013.01); *G02F 1/133345* (2013.01); *G02F 1/133528* (2013.01); *G02F 1/133707* (2013.01); *G02F 1/133753* (2013.01); *G02F 1/134309* (2013.01); *G02F 1/136227* (2013.01); *G02F 1/13394* (2013.01); *G02F 1/136213* (2013.01); *G02F 2001/13712* (2013.01); *G02F 2001/133531* (2013.01); *G02F 2001/133757* (2013.01); *G02F 2201/123* (2013.01)

(56) References Cited

U.S. PATENT DOCUMENTS

| | | |
|---|---|---|
| 6,977,704 B2 | 12/2005 | Kataoka |
| 7,420,647 B2 | 9/2008 | Nakahata |
| 7,671,952 B2 | 3/2010 | Su et al. |
| 2003/0043336 A1 | 3/2003 | Sasaki et al. |
| 2005/0264750 A1* | 12/2005 | Andoh ................ G02F 1/13394 349/156 |
| 2006/0146243 A1 | 7/2006 | Nakanishi et al. |
| 2006/0244881 A1 | 11/2006 | Sasaki et al. |
| 2008/0007681 A1 | 1/2008 | Chen |
| 2008/0143914 A1 | 6/2008 | Nakagawa et al. |
| 2008/0143937 A1 | 6/2008 | Nakagawa et al. |
| 2008/0192165 A1 | 8/2008 | Nakagawa et al. |
| 2009/0015745 A1 | 1/2009 | Nakagawa et al. |
| 2009/0244428 A1 | 10/2009 | Nakagawa et al. |

FOREIGN PATENT DOCUMENTS

| | | |
|---|---|---|
| JP | 2002-357830 | 12/2002 |
| JP | 2003-149647 | 2/2003 |
| JP | 2004-302168 | 10/2004 |
| JP | 2005-352091 | 12/2005 |
| JP | 2008-501127 | 1/2008 |
| JP | 2009-151204 | 7/2009 |
| WO | WO 2009/154031 A1 | 12/2009 |

OTHER PUBLICATIONS

International Search Report for PCT/JP2010/063994, filed Aug. 19, 2010.

* cited by examiner

LIQUID CRYSTAL DISPLAY DEVICE

This application is a continuation of U.S. patent application Ser. No. 13/392,235 filed Feb. 24, 2012, pending, which is the U.S. national phase of International Application No. PCT/JP2010/063994, filed 19 Aug. 2010, which designated the U.S. and claims priority to JP Application No. 2009-193459, filed 24 Aug. 2009, the entire contents of each of which are hereby incorporated by reference.

TECHNICAL FIELD

The present invention relates to a liquid crystal display device, and specifically to a liquid crystal display device having a plurality of alignment domains in a pixel.

BACKGROUND ART

Currently, as liquid crystal display devices having a wide viewing angle characteristic, the following liquid crystal display devices have been developed, for example: liquid crystal display devices using an IPS (In-Plane-Switching) mode or an FFS (Fringe Field Switching) mode, which are transverse electric field modes, and liquid crystal display devices using a VA (Vertical Alignment) mode.

VA-mode liquid crystal display devices include, for example, liquid crystal display devices of an MVA (Multi-domain Vertical Alignment) mode in which a plurality of domains having different alignment directions of liquid crystal molecules are formed in one pixel, and liquid crystal display devices of a CPA (Continuous Pinwheel Alignment) mode in which the alignment direction of liquid crystal molecules is continuously varied around a rivet or the like formed on an electrode at a central position of the pixel.

An example of MVA-mode liquid crystal display device is described in Patent Document 1. In the liquid crystal display device described in Patent Document 1, alignment regulation means extending in two directions perpendicular to each other is provided. Owing to this, four liquid crystal domains are formed in one pixel in which an azimuthal angle of directors which are representative of the respective liquid crystal domains is 45° with respect to polarization axes (transmission axes) of a pair of polarizing plates placed in crossed Nicols. Where the azimuthal angle of 0° corresponds to a direction of the polarization axis of one of the polarizing plates and the counterclockwise direction is the positive direction, the azimuthal angles of the directors of the four liquid crystal domains are 45°, 135°, 225°, and 315°. Such a structure in which four domains are formed in one pixel is referred to as the "4-domain alignment structure" or simply as the "4D structure".

Other examples of MVA-mode liquid crystal display device are described in Patent Documents 2, 3 and 4. The liquid crystal display devices described in these patent documents each include pixel electrodes having many tiny slits (cutouts) extending in an azimuthal angle direction of 45°-225° and an azimuthal angle direction of 135°-315° (such pixel electrodes are referred to as the "comb-shaped pixel electrodes" or "fishbone-type pixel electrodes"). The 4-domain alignment structure is realized by aligning liquid crystal molecules to be parallel to these slits.

CITATION LIST

Patent Literature

Patent Document 1: Japanese Laid-Open Patent Publication No. 11-242225

Patent Document 2: Japanese Laid-Open Patent Publication No. 2002-357830

Patent Document 3: Japanese Laid-Open Patent Publication No. 2004-302168

Patent Document 4: Japanese Laid-Open Patent Publication No. 2009-151204

SUMMARY OF INVENTION

Technical Problem

FIG. 33 is a plan view showing a shape of a fishbone-type pixel electrode 7 in a liquid crystal display device described in Patent Document 2. The pixel electrode 7 has a trunk slit 8 and a branch slit 9 formed therein. The trunk slit 8 includes a trunk portion extending in a 0°-180° direction (left-right direction in the figure) and a trunk portion extending in a 90°-270° direction (top-bottom direction in the figure). The branch slit 9 includes a plurality or branch portions extending in a direction of 45° from the trunk slit 8, a plurality of branch portions extending in a direction of 135° from the trunk slit 8, a plurality of branch portions extending in a direction of 225° from the trunk slit 8, and a plurality of branch portions extending in a direction of 315° from the trunk slit 8. The 4D structure is provided by locating the branch slit 9 extending in four directions as described above.

In general, a TFT (Thin Film Transistor) substrate of a liquid crystal display device includes scanning lines (source bus lines) located on a base plate, TFTs formed on the scanning lines with a gate insulating film interposed therebetween, and pixel electrodes provided on the TFTs with an insulating layer interposed therebetween. A drain electrode of each TFT and the corresponding pixel electrode are electrically connected to each other via a contact hole formed in the insulating layer. The pixel electrode has a part which is formed along an inner face of the contact hole and thus has a recessed portion. The alignment of liquid crystal molecules may be disturbed by the recessed portion.

In many liquid crystal display devices, column-like spacers are located between the TFT substrate and a counter electrode in order to maintain the thickness of a liquid crystal layer at a prescribed value and thus to provide a high display quality. These spacers may also occasionally disturb the alignment of the liquid crystal molecules.

When the alignment of the liquid crystal molecules is disturbed by the elements such as the contact holes, the spacers or the like, there occurs a problem that the number of the liquid crystal molecules which effectively contribute to the formation of four domains of the 4D structure is decreased, which results in reduction of the transmittance or the viewing angle characteristic.

The above-described patent documents do not discuss, or propose any measure against, such a problem which may occur in a liquid crystal display device including fishbone-type pixel electrodes. Patent Document 4 describes a structure of forming contact holes and storage capacitance counter electrodes below the pixel electrode, but does not provide any measure for preventing the alignment disturbance of the liquid crystal molecules which is caused by the contact holes or the storage capacitance electrodes. In addition, these documents do not provide any consideration on a positional relationship, between the fishbone-type pixel electrode and the lines located below the pixel electrode, which provides an appropriate alignment of the liquid crystal molecules.

The present invention made to solve at least one of these problems has an object of providing a vertical alignment type liquid crystal display device having a high transmittance or a high viewing angle characteristic.

Solution to Problem

A liquid crystal display device according to the present invention, which includes a plurality of pixels arrayed in a matrix, includes a TFT substrate including pixel electrodes respectively formed in correspondence with the plurality of pixels, TFTs respectively formed in correspondence with the plurality of pixels, and an insulating layer having a contact hole formed therein for electrically connecting a drain electrode of each of the TFTs and each of the pixel electrodes to each other; a counter substrate including a counter electrode facing the pixel electrodes; and a liquid crystal layer located between the TFT substrate and the counter substrate, the liquid crystal layer containing liquid crystal molecules having a negative dielectric anisotropy. The pixel electrodes each include a peripheral portion, an island portion including a portion which electrically contacts the drain electrode in the contact hole, and a plurality of branch portions extending from the peripheral portion; the plurality of branch portions include a plurality of first branch portions extending in a first direction, a plurality of second branch portions extending in a second direction, a plurality of third branch portions extending in a third direction, and a plurality of fourth branch portions extending in a fourth direction; the first direction, the second direction, the third direction and the fourth direction are different from each other; a first region in which the liquid crystal molecules are aligned along the first branch portions at the time of voltage application, a second region in which the liquid crystal molecules are aligned along the second branch portions at the time of voltage application, a third region in which the liquid crystal molecules are aligned along the third branch portions at the time of voltage application, and a fourth region in which the liquid crystal molecules are aligned along the fourth branch portions at the time of voltage application are formed by the first branch portions, the second branch portions, the third branch portions and the fourth branch portions; and when seen in a direction vertical to a surface of the TFT substrate, the island portion is surrounded by the first region, the second region, the third region and the fourth region; and the island portion is electrically connected to the peripheral portion by a connection portion other than the plurality of branch portions but not by any of the plurality of branch portions, or electrically connected to the peripheral portion by one of the first branch portions, one of the second branch portions, one of the third branch portions or one of the fourth branch portions.

In an embodiment, ends of all the plurality of branch portions opposite to the peripheral portion are separated from the island portion, and the peripheral portion and the island portion are electrically connected to each other by only one connection portion.

In an embodiment, ends of all the plurality of branch portions opposite to the peripheral portion are separated from the island portion, and the peripheral portion and the island portion are electrically connected to each other by only two connection portions.

In an embodiment, when seen in the direction vertical to the surface of the TFT substrate, the two connection portions are located to be symmetrical to each other with respect to the center of the island portion or the center of the pixel.

In an embodiment, the island portion is electrically connected to only one of the first branch portions, only one of the second branch portions, only one of the third branch portions and only one of the fourth branch portions.

In an embodiment, when seen in the direction vertical to the surface of the TFT substrate, one of the first branch portions and one of the second branch portions are located to be symmetrical to one of the third second branch portions and one of the fourth branch portions with respect to the center of the island portion or a line which equally divides the pixel into two.

In an embodiment, when seen in the direction vertical to the surface of the TFT substrate, the island portion has a shape which is symmetrical with respect to the center thereof or the center of the pixel.

In an embodiment, the island portion is electrically connected to only one branch portion among all the first branch portions, the second branch portions, the third branch portions and the fourth branch portions.

In an embodiment, when seen in the direction vertical to the surface of the TFT substrate, an outer edge of the island portion is surrounded by two among the four regions of a first pixel and two among the four regions of a second pixel adjoining the first pixel.

In an embodiment, ends of all the plurality of branch portions opposite to the peripheral portion are separated from the island portion, and the peripheral portion and the island portion are electrically connected to each other with none of the plurality of branch portions being connected therebetween.

In an embodiment, when seen in the direction vertical to the surface of the TFT substrate, an outer edge of the island portion includes a first end facing the first region, a second end facing the second region, a third end facing the third region, and a fourth end facing the fourth region; and the first end includes an end portion extending along the first branch portions, the second end includes an end portion extending along the second branch portions, the third end includes an end portion extending along the third branch portions, and the fourth end includes an end portion extending along the fourth branch portions.

In an embodiment, the first end extends in the first direction, the second end extends in the second direction, the third end extends in the third direction, and the fourth end extends in the fourth direction.

In an embodiment, the first end and the third end extend parallel to each other, and the second end and the fourth end extend parallel to each other in a direction different by 90° from the first end.

In an embodiment, the liquid crystal display device further includes a first polarizing plate and a second polarizing plate located so as to hold the liquid crystal layer therebetween. An absorption axis of the first polarizing plate and an absorption axis of the second polarizing plate cross each other perpendicularly, and the first direction, the second direction, the third direction and the fourth direction are each different by 45° from the absorption axis of the first polarizing plate or the second polarizing plate.

In an embodiment, the liquid crystal display device further includes a spacer located between the TFT substrate and the counter substrate. When seen in the direction vertical to the surface of the TFT substrate, the spacer is located so as not to overlap the pixel electrode.

In an embodiment, when seen in the direction vertical to the surface of the TFT substrate, the plurality of pixels are each rectangular, and the spacer is located at least at one of four corners of each of the plurality of pixels.

In an embodiment, when seen in the direction vertical to the surface of the TFT substrate, in the vicinity of the spacer, a part of the peripheral portion of the pixel electrode extends perpendicularly to a direction in which the plurality of corresponding branch portions extend.

In an embodiment, when seen in the direction vertical to the surface of the TFT substrate, the plurality of pixels are each rectangular, and the spacer is located at a central position of at least one of four sides of each of the plurality of pixels.

In an embodiment, when seen in the direction vertical to the surface of the TFT substrate, in the vicinity of the spacer, a part of the peripheral portion of the pixel electrode extends along a direction in which the plurality of corresponding branch portions extend.

In an embodiment, the liquid crystal display device further includes a spacer located between the TFT substrate and the counter substrate. When seen in the direction vertical to the surface of the TFT substrate, the spacer is located so as to overlap the pixel electrode.

In an embodiment, when seen in the direction vertical to the surface of the TFT substrate, the plurality of pixels are each rectangular, and the spacer is located at least at one of four corners of each of the plurality of pixels.

In an embodiment, when seen in the direction vertical to the surface of the TFT substrate, the plurality of pixels are each rectangular, and the spacer is located at a central position of at least one of four sides of each of the plurality of pixels.

Another liquid crystal display device according to the present invention, which includes a plurality of pixels arrayed in a matrix, includes a TFT substrate including pixel electrodes respectively formed in correspondence with the plurality of pixels, TFTs respectively formed in correspondence with the plurality of pixels, and an insulating layer having a contact hole formed therein for electrically connecting a drain electrode of each of the TFTs and each of the pixel electrodes to each other; a counter substrate including a counter electrode facing the pixel electrodes; and a liquid crystal layer located between the TFT substrate and the counter substrate, the liquid crystal layer containing liquid crystal molecules having a negative dielectric anisotropy. The pixel electrodes each include a peripheral portion, an island portion including a portion which electrically contacts the drain electrode in the contact hole, a plurality of trunk portions extending from the island portion, and a plurality of branch portions extending from the plurality of trunk portions or the island portion; the plurality of branch portions include a plurality of first branch portions extending in a first direction, a plurality of second branch portions extending in a second direction, a plurality of third branch portions extending in a third direction, and a plurality of fourth branch portions extending in a fourth direction; the first direction, the second direction, the third direction and the fourth direction are different from each other; a first region in which the liquid crystal molecules are aligned along the first branch portions at the time of voltage application, a second region in which the liquid crystal molecules are aligned along the second branch portions at the time of voltage application, a third region in which the liquid crystal molecules are aligned along the third branch portions at the time of voltage application, and a fourth region in which the liquid crystal molecules are aligned along the fourth branch portions at the time of voltage application are formed by the first branch portions, the second branch portions, the third branch portions and the fourth branch portions; and when seen in a direction vertical to a surface of the TFT substrate, the island portion is surrounded by the first region, the second region, the third region and the fourth region; there is an insulating portion between ends of all the plurality of branch portions and the peripheral portion; and the island portion is electrically connected to the peripheral portion by a connection portion other than the plurality of branch portions.

In an embodiment, ends of all the branch portions opposite to the trunk portions or the island portion are separated from the peripheral portion, and the peripheral portion and the island portion are electrically connected to each other by only one connection portion.

In an embodiment, the liquid crystal display device further includes a first polarizing plate and a second polarizing plate located so as to hold the liquid crystal layer therebetween. An absorption axis of the first polarizing plate and an absorption axis of the second polarizing plate cross each other perpendicularly, and the first direction, the second direction, the third direction and the fourth direction are each different by 45° from the absorption axis of the first polarizing plate or the second polarizing plate.

In an embodiment, the liquid crystal display device further includes a spacer located between the TFT substrate and the counter substrate. When seen in the direction vertical to the surface of the TFT substrate, the spacer is located so as not to overlap the pixel electrode.

In an embodiment, when seen in the direction vertical to the surface of the TFT substrate, the plurality of pixels are each rectangular, and the spacer is located at a central position of at least one of four sides of each of the plurality of pixels.

In an embodiment, when seen in the direction vertical to the surface of the TFT substrate, in the vicinity of the spacer, a part of the peripheral portion of the pixel electrode extends along a direction in which the plurality of corresponding branch portions extend.

Advantageous Effects of Invention

According to the present invention, a liquid crystal display device having a high transmittance or a high viewing angle characteristic can be provided.

DESCRIPTION OF EMBODIMENTS

Hereinafter, structures of vertical alignment type liquid crystal display devices 100 in embodiments according to the present invention will be described with reference to the drawings. It should be noted that the present invention is not limited to the following embodiments.

Figure 1:
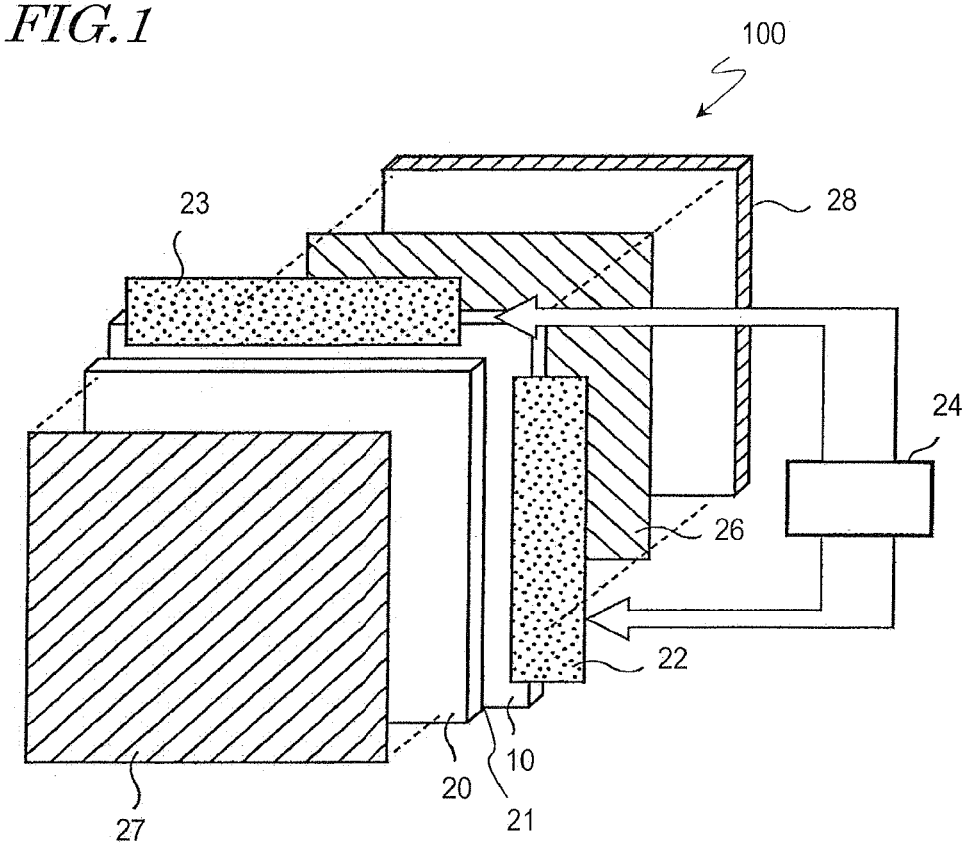
FIG. 1 is an isometric view schematically showing a structure of a liquid crystal display device 100 according to the present invention.
Figure 2:
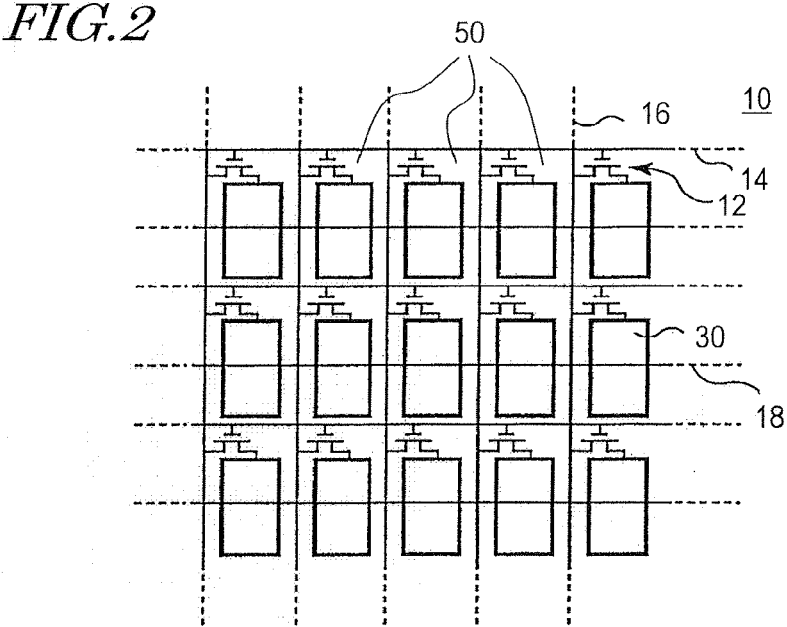
FIG. 2 is a plan view schematically showing a structure of a plurality of pixels 50 of the liquid crystal display device 100.

FIG. 1 is an isometric view schematically showing a structure of the liquid crystal display device 100, and FIG. 2 is a plan view schematically showing a structure of a plurality of pixels 50 of the liquid crystal display device 100.

As shown in FIG. 1, the liquid crystal display device 100 includes a TFT substrate 10 and a counter substrate (CF substrate) 20 which face each other while holding a liquid crystal layer 21 therebetween, polarizing plates 26 and 27 respectively located outer to the TFT substrate 10 and the counter substrate 20, and a backlight unit 28 for outputting light for display toward the polarizing plate 26.

The liquid crystal display device 100 is a vertical alignment type liquid crystal display device for providing display in a normally black mode by means of the pixels 50 which are, as shown in FIG. 2, arrayed in a matrix in an X direction (left-right direction in the figure) and a Y direction (top-bottom direction in the figure). A minimum display unit is formed of three primary colors of red (R), green (G) and blue (B). Each of the pixels 50 corresponds to a display area of one color among R, G and B. The minimum display unit may be formed of four or more primary colors (multi-color display). In such a case, each pixel 50 corresponds to a display area of one color among a plurality of primary colors which form the minimum display unit.

The TFT substrate 10 includes a plurality of scanning lines (gate bus lines) 14 and a plurality of signal lines (data bus lines) 16 which are located so as to cross each other perpendicularly. In the vicinity of each of intersections of the plurality of scanning lines 14 and the plurality of signal lines 16, a TFT 12 as an active element is formed in correspondence with each pixel 50. Each pixel 50 includes a pixel electrode 30 which is electrically connected to a drain electrode of the TFT 12 and is formed of, for example, ITO (Indium Tin Oxide) or IZO (Indium Zinc Oxide). Each two adjoining scanning lines 14 may have therebetween a storage capacitance line (also referred to as the "storage capacitance bus line" or the "Cs line") 18 extending parallel to the scanning lines 14. The scanning lines 14 and the storage capacitance lines 18 may be positionally replaced with each other so that the TFTs 12 are located in the vicinity of the corresponding scanning lines.

The plurality of scanning lines 14 are each connected to a scanning line driving circuit 22 shown in FIG. 1, and the plurality of signal lines 16 are each connected to a signal line driving circuit 23 shown in FIG. 1. The scanning line driving circuit 22 and the signal line driving circuit 23 are connected to a control circuit 24. In accordance with the control by the control circuit 24, a scanning signal for turning the TFT 12 on or off is supplied from the scanning line driving circuit 22 to the corresponding scanning line 14. In accordance with the control by the control circuit 24, a display signal (voltage to be applied to the pixel electrodes 30) is supplied from the signal line driving circuit 23 to the plurality of signal lines 16.

As described later with reference to FIG. 4, the counter substrate 20 includes color filters 13, a common electrode (counter electrode) 25 and a black matrix (BM) 11. In the case where the liquid crystal display device 100 provides display by three primary colors, the color filters 13 include an R (red) filter, a G (green) filter and a B (blue) filter each located in correspondence with a pixel. The common electrode 25 is formed so as to cover the plurality of pixel electrodes 30. In accordance with the difference in potentials given between the common electrode 25 and each pixel electrode 30, liquid crystal molecules between these electrodes are aligned in each pixel and thus display is provided.

Embodiment 1

Figure 3:
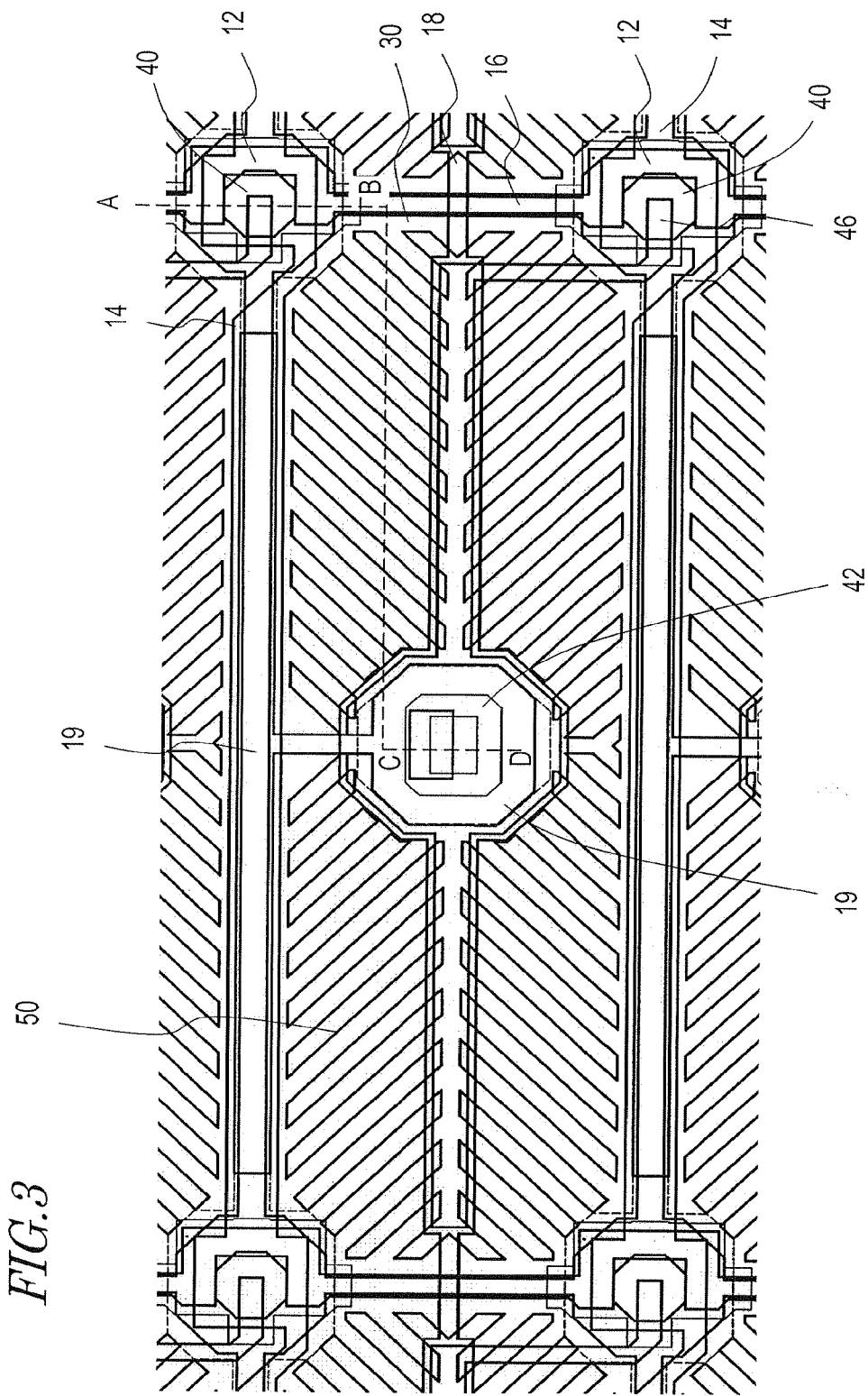
FIG. 3 is a plan view showing a structure of a pixel 50 of a liquid crystal display device 100 in Embodiment 1 according to the present invention.

FIG. 3 is a plan view showing a structure of a pixel 50 of a liquid crystal display device 100 in Embodiment 1 according to the present invention. FIG. 4 is a cross-sectional view showing a structure of an A-D cross-section of the pixel 50 shown in FIG. 3. FIG. 5 is a plan view showing a line configuration, of the pixel 50, below the pixel electrode 30 of the TFT substrate. FIG. 6 is a plan view schematically showing a shape of the pixel electrode 30. FIG. 5 and FIG. 6 show a location arrangement of spacers 40 in addition to the line configuration or the pixel electrode 30.

Figure 4:
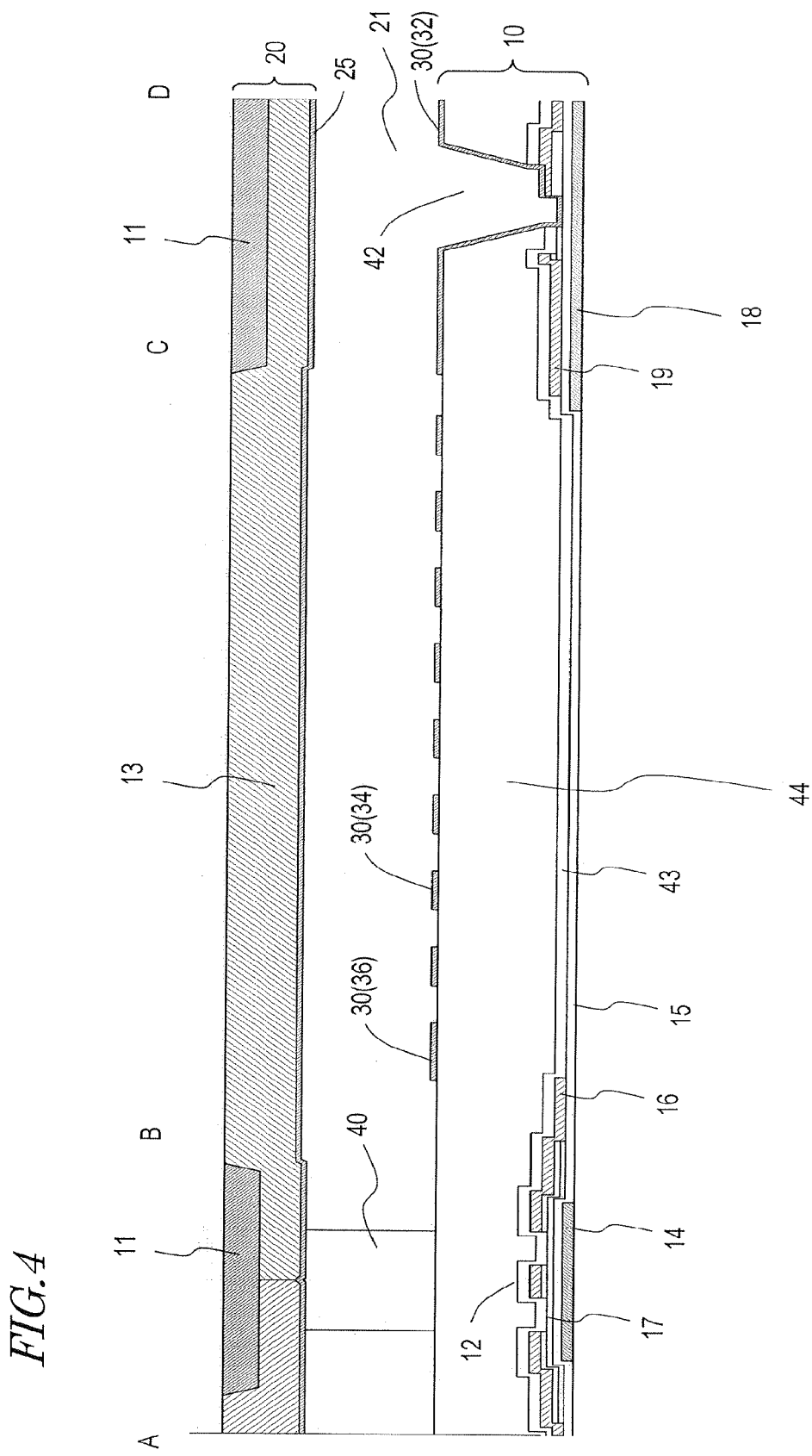
FIG. 4 is a cross-sectional view showing a structure of an A-D cross-section of the pixel 50 shown in FIG. 3 in Embodiment 1.
Figure 5:
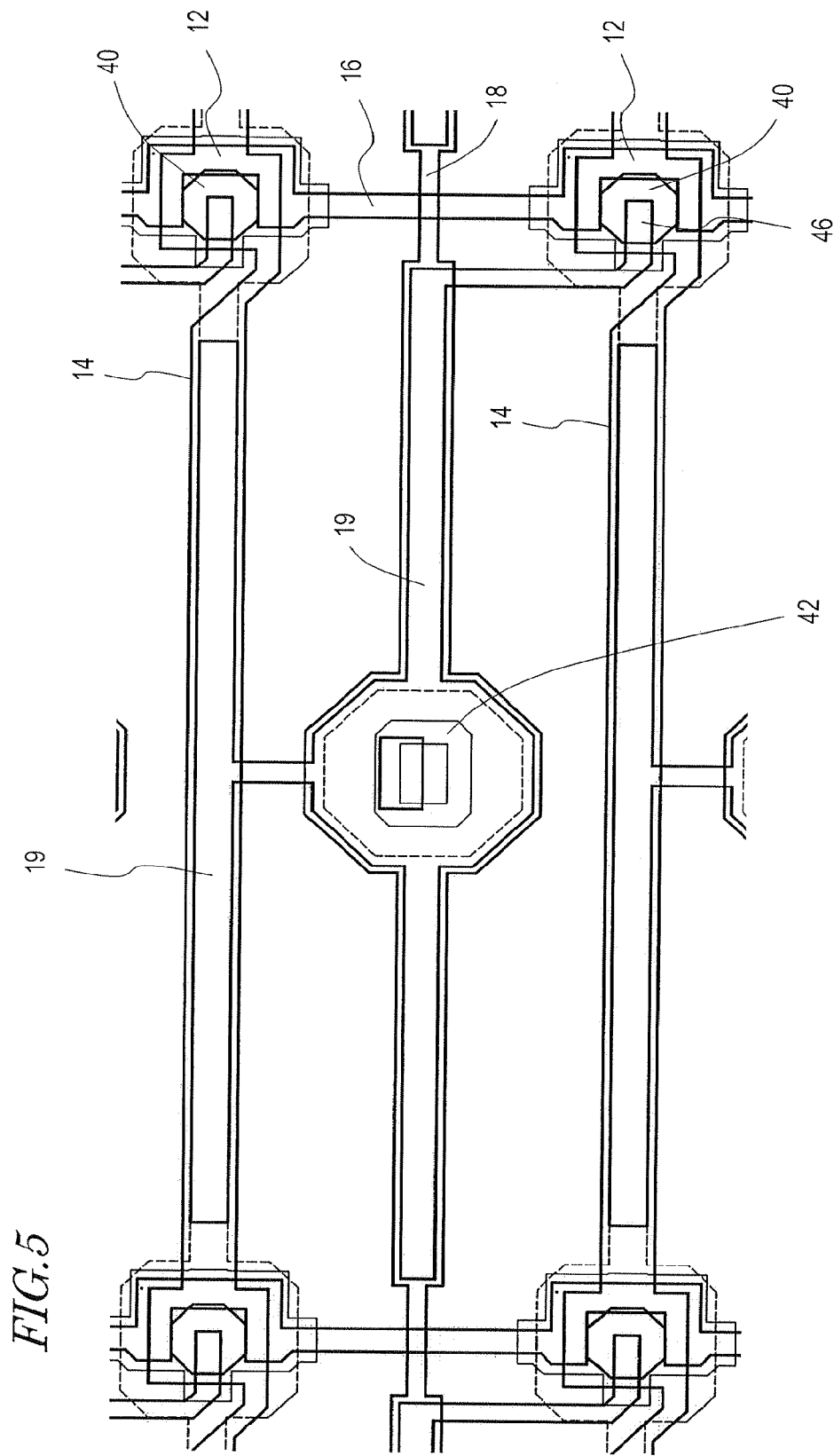
FIG. 5 is a plan view showing a line configuration of the pixel 50 in Embodiment 1.
Figure 6:
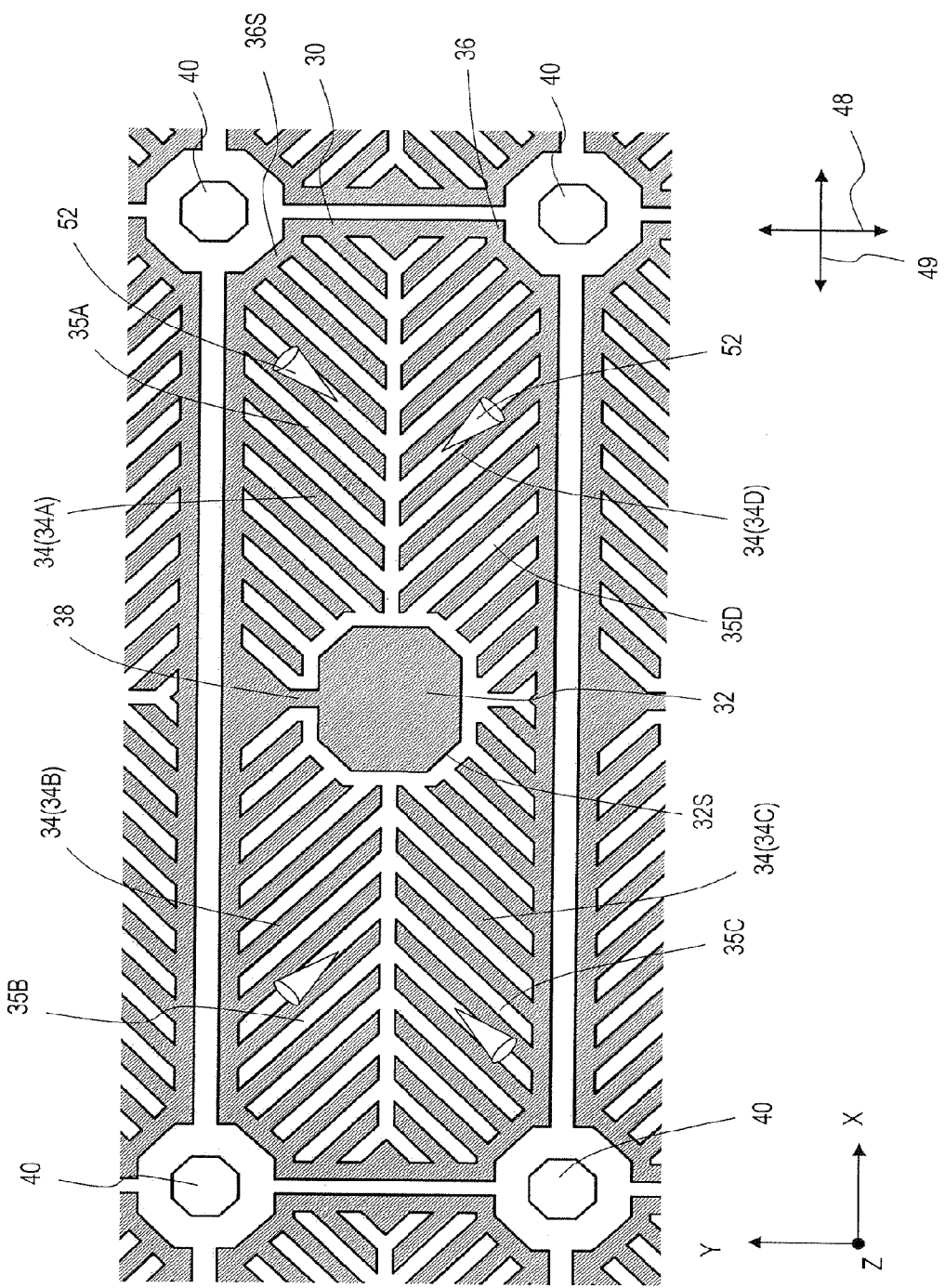
FIG. 6 is a plan view showing a shape of a pixel electrode 30 in Embodiment 1.

As shown in FIG. 3 through FIG. 5, the TFT substrate 10 of the liquid crystal display device 100 includes the scanning lines 14, storage capacitance lines 18, the TFTs 12, the signal lines 16, storage capacitance counter electrodes 19 and the fishbone-type pixel electrodes 30 formed on a transparent plate. On the scanning lines 14 and the storage capacitance lines 18, a gate insulating film 15 is formed. Each TFT 12 is formed on the corresponding scanning line 14 with the gate insulating film 15 interposed therebetween, and each storage capacitance counter electrode 19 is formed on the corresponding storage capacitance line 18 with the gate insulating film 15 interposed therebetween. The scanning lines 14, the storage capacitance lines 18, the signal lines 16 and the storage capacitance counter electrodes 19 each have a single layer structure formed of Al (aluminum), Ti (titanium), TiN (titanium nitride), Mo (molybdenum) or the like, or an alloy thereof, or alternatively have a stacking structure including a plurality of such metal layers stacked.

Each TFT 12 includes a semiconductor layer 17 formed on the gate insulating film 15. A source electrode of the TFT 12 is electrically connected to the corresponding signal line 16, and the drain electrode 46 of the TFT 12 is electrically connected to the corresponding storage capacitance counter electrode 19 as shown in FIG. 3 and FIG. 5. A part of the storage capacitance line 18 and the storage capacitance counter electrode 19 which face each other while holding the gate insulating film 15 therebetween form a storage capacitance. As shown in FIG. 4, the TFT 12, the signal line 16, and the storage capacitance counter electrode 19 are covered with a protective insulating film 43, and an interlayer insulating film 44 is formed on the protective insulating film 43. One of, or both of, the protective insulating film 43 and the interlayer insulating film 44 may occasionally be referred to as the "insulating film".

In the protective insulating film 43 and the interlayer insulating film 44, a contact hole 42 is formed at a position above the storage capacitance counter electrode 19. The drain electrode 46 of the TFT 12 and the pixel electrode 30 are electrically connected to each other via the contact hole 42. More specifically, a part of the pixel electrode 30 which is formed on an inner face of the contact hole 42 is connected to the storage capacitance counter electrode 19 or an electrode extending from the storage capacitance counter electrode 19 at a bottom of the contact hole 42, and thus the pixel electrode 30 and the drain electrode 46 are electrically connected to each other.

As shown in FIG. 4, the counter substrate 20 includes the common electrode 25, the color filters 13, and the black matrix 11. Between the TFT substrate 10 and the counter substrate 20, a liquid crystal layer 21 containing a nematic liquid crystal molecules having a negative dielectric anisotropy ($\Delta\epsilon<0$) is located. The liquid crystal layer 21 has a thickness of 3.1 µm. Preferably, the thickness of the liquid crystal layer 21 is 2.0 µm or greater and 5.0 µm or less. The liquid crystal layer 21 may contain a chiral agent. Although not shown, an alignment film (vertical alignment film) is formed on the interlayer insulating film 44 and the pixel electrodes 30 in the TFT substrate 10 (on the liquid crystal layer 21 side), and an alignment film (vertical alignment film) is formed on the common electrode 25 (on the liquid crystal layer 21 side). By the action of the alignment films, the liquid crystal molecules of the liquid crystal layer 21 are aligned vertically with respect to a surface of the TFT substrate 10 or the counter substrate 20 in the absence of a voltage.

On the alignment film of each of the TFT substrate 10 and the counter substrate 20, an alignment sustaining layer may be formed for providing the liquid crystal molecules with a pretilt in the absence of a voltage. The alignment sustaining layer is a polymer layer which is formed as follows. A photo-polymerizable monomer is mixed in a liquid crystal material in advance, and after the liquid crystal cell is formed, the photo-polymerizable monomer is photo-polymerized in the state where a voltage is applied to the liquid crystal layer. Owing to the alignment sustaining layers, a pretilt of the liquid crystal molecules in a direction tilted slightly (e.g., about 2 to 3°) from the direction vertical to the substrate surface, and the alignment direction (pretilt azimuth), can be sustained (stored) even in the absence of a voltage. This technology is referred to as the PSA (Polymer Sustained Alignment) technology, and use of this technology can improve the response speed regarding the alignment of liquid crystal molecules at the time of voltage application.

Between the TFT substrate 10 and the counter substrate 20, column-like spacers 40 are located for maintaining the thickness of the liquid crystal layer 21 to a prescribed value or in a prescribed range. In this embodiment, the spacers are located above the TFTs 12 in the vicinity of four corners of the pixel electrode 30, which has an approximately rectangular outer edge shape.

Now, with reference to FIG. 6, the pixel electrode 30 and the spacers 40 will be described in more detail. In the description of this embodiment, the direction in which the scanning lines 14 extend (left-right direction in the figure) is the X direction, the direction in which the signal lines 16 extend (top-bottom direction in the figure) is the Y direction, and the direction vertical to the surface of the substrates of the liquid crystal display device 100 is the Z direction. A positive X direction (direction from the left to the right in the figure) is the direction of an azimuthal angle of 0°, and the azimuthal angle is set counterclockwise. A positive Y direction (direction from the bottom to the top in the figure) is the direction of an azimuthal angle of 90°.

The pixel electrode 30 includes a peripheral portion 36 extending along an outer edge thereof, an island portion 32 formed so as to cover the contact hole 42 when seen in the Z direction, and a plurality of branch portions 34 extending from the peripheral portion 36 inward in the pixel 50. The peripheral portion 36 includes portions extending in the X direction and portions extending in the Y direction. The plurality of branch portions 34 are formed of a plurality of first branch portions 34A extending in a direction of 225° (first direction) from the peripheral portion 36, a plurality of second branch portions 34B extending in a direction of 315° (second direction) from the peripheral portion 36, a plurality of third branch portions 34C extending in a direction of 45° (third direction) from the peripheral portion 36, and a plurality of fourth branch portions 34D extending in a direction of 135° (fourth direction) from the peripheral portion 36.

The island portion 32 is electrically connected to the peripheral portion 36 by one connection portion 38 of the pixel electrode 30 extending from the peripheral portion 36, but not by any of the plurality of branch portions 34. A narrowest part of the connection portion 38 has a length of 6.0 µm. Such a length of the narrowest part prevents the connection 38 from being broken, which can suppress production of defective products. In addition, all the branch portions 34 are connected to the peripheral portion 36. Therefore, even if a part of the peripheral portion 36 is broken, all the branch portions 34 can be supplied with a voltage. In this manner, the peripheral portion 36 acts as redundant means for voltage supply (or means for avoiding disconnection of voltage supply) to the branch portions 34.

None of ends of all the plurality of branch portions 34 opposite to the peripheral portion 36 is connected to any other portion of the pixel electrode or the island portion 32. Namely, there is an insulating portion (or an electrode-absent portion) between the ends of all the plurality of branch portions 34 and the island portion 32. The plurality of branch portions 34 all have an identical width and extend with the same width. The width of each branch portion 34 is 3.5 μm. Preferably, the width of each branch portion 34 is in the range of 1.0 μm or greater and 5.0 μm or less.

Regarding each of the first through fourth branch portions 34A through 34D, each two adjoining branch portions have a branch slit (portion with no electrode material) therebetween. Each branch slit extends along the adjoining first branch portions 34A, second branch portions 34B, third branch portions 34C or fourth branch portions 34D. Each branch slit has a width of 3.0 μm. Preferably, the width of each branch slit is in the range of 1.0 μm or greater and 5.0 μm or less.

Between the first branch portions 34A and the fourth branch portions 34D, and between the second branch portions 34B and the third branch portions 34C, trunk slits are formed so as to extend on a straight line which equally divides the pixel electrode 30 into two in the Y direction. Between the third branch portions 34C and the fourth branch portions 34D, a trunk slit is formed so as to extend on a straight line which equally divides the pixel electrode 30 into two in the X direction. The trunk slits have a width of 3.5 μm. When the width of the trunk slits is 2.0 μm or less, the liquid crystal molecules may undesirably be aligned in a direction opposite to a desired direction from the trunk slits as the starting point at the time of voltage application. Therefore, the width of the trunk slits is preferably greater than 2.0 μm.

A border between each two pixel electrodes 30 adjoining each other in the Y direction is on the scanning line 14, and a border between each two pixel electrodes 30 adjoining each other in the X direction is on the signal line 16. Each two adjoining pixel electrodes 30 are away from each other by a distance of 3.5 μm. Preferably, the distance is 6.0 μm or less in order to widen the border between such two adjoining pixel electrodes 30 and thus to increase the area contributing to the display.

When a voltage is applied to liquid crystal molecules 52, four liquid crystal alignment domains 35A, 35B, 35C and 35D are formed by the first branch portions 34A, the second branch portions 34B, the third branch portions 34C and the fourth branch portions 34D. The liquid crystal molecules 52 are aligned along the first branch portions 34A in the alignment domain 35A, along the second branch portions 34B in the alignment domain 35B, along the third branch portions 34C in the alignment domain 35C, and along the fourth branch portions 34D in the alignment domain 35D. It should be noted that the directions in which the liquid crystal molecules 52 are tilted in the alignment domains 35A, 35B, 35C and 35D at the time of voltage application are respectively opposite to the first, second, third and fourth directions mentioned above. As shown in FIG. 6, the liquid crystal molecules are each tilted such that a tip thereof (end on the counter substrate 20 side) is directed toward the peripheral portion 36 of the pixel electrode 30.

As shown in FIG. 6, absorption axes 48 and 49 of the polarizing plates 26 and 27 extend in the X direction and the Y direction. The directions of the absorption axes 48 and 49 are different by 45° from any of the first through fourth directions. Accordingly, the alignment direction of the liquid crystal molecules in each alignment domain is different by 45° from the directions of the absorption axes 48 and 49. This realizes display with little viewing angle dependence.

When seen in the Z direction, an outer edge 32S of the island portion 32 faces all the four domains 35A, 35B, 35C and 35D. None of the ends of the first branch portions 34A, the second branch portions 34B, the third branch portions 34C and the fourth branch portions 34D (collectively referred to as the "plurality of branch portions") is connected to the island portion 32. Therefore, there is a gap (slit, or electrode-absent portion) between the outer edge 32S of the island portion 32 and the plurality of branch portions. Owing to this gap, the liquid crystal molecules 52 in each of the alignment domains are not influenced easily by an electric field generated on the island portion 32 at the time of voltage application. Therefore, alignment disturbance of the liquid crystal molecules in each alignment domain can be reduced. This realizes display having a high transmittance or a high viewing angle characteristic. In order to provide superb display, it is preferable that at least 80% of the outer edge 32S of the island portion 32 is surrounded by the gap.

The scanning lines 14, the signal lines 16, the storage capacitance lines 18, and the storage capacitance counter electrodes 19 block light. In this embodiment, gaps each sandwiched by two pixel electrodes 30 are present above the scanning lines 14 and the signal lines 16, the trunk slits are present above the storage capacitance lines 18, and the island portions 32 are present above the storage capacitance counter electrodes 19. The gaps, the trunk slits and the island portions 32 do not greatly contribute to the luminance. Therefore, in this embodiment, superb display in which the luminance, which is reduced due to the metal lines, is not reduced much is provided.

When seen in the Z direction, the pixel 50 is rectangular, and the spacers 40 are located at four corners of the pixel 50 so as not to overlap the pixel electrode 30. The four corners of the pixel electrode 30 are recessed inward (the four corners are cut off), and a portion of the peripheral portion 36 in the vicinity of each spacer 40 includes a portion 36S extending parallel to an outer edge of the spacer 40. The portion 36S of the peripheral portion 36 extends perpendicularly to a direction in which the plurality of branch portions 34 in the vicinity thereof extend. Owing to the portions 36S of the peripheral portion 36, the liquid crystal molecules at each of the corners can be aligned in a direction closer to the perpendicular direction to the direction in which the corresponding branch portions 34 extend at the time of voltage application. Therefore, display with a high luminance can be provided.

Since the spacers 40 are located at the corners, one of side surfaces of each spacer 40 on the pixel electrode 30 side is perpendicular to the direction in which the branch portions 34 in the vicinity of the corresponding spacer 40 extend. Namely, at each of the corners, the alignment direction of the liquid crystal molecules urged by an electric field generated by the plurality of branch portions 34 and the gaps therebetween, or the alignment direction of the liquid crystal molecules urged by a polymer layer formed in order to sustain (store) the initial alignment of the liquid crystal molecules, is not counteracted by the alignment direction of the liquid crystal molecules urged by the spacer 40 and an alignment film on a surface thereof, at the time of voltage application. Therefore, an area in the vicinity of each spacer 40 in which the alignment of the liquid crystal molecules is disturbed can be decreased. As a result, superb display having a high luminance with no coarseness can be provided. In addition, since gaps are present between the spacers 40 and the pixel electrode 30, the alignment disturbance of the liquid crystal molecules which is caused by the surfaces of each spacer 40 other than the surface perpendicular to the direction in which the corresponding branch portions 34 extend is suppressed from being conveyed to the liquid crystal molecules on the pixel electrode 30.

In this embodiment, the spacers 40 are located at all the four corners of the pixel 50, but the spacers 40 do not need to be located at all the corners. The location arrangement of the spacers 40 may be different for each pixel 50. All the spacers 40 do not need to have the same size or shape. In this embodiment, the spacers 40 have an octagonal cross-section, but there is no limitation on the cross-sectional shape of the spacers 40. For example, the spacers 40 may have a cross-section of any other polygonal shape or a cylindrical cross-section.

On the TFT 12, the black matrix 11 is located so as to cover the TFT 12. The presence of the spacers 40 may undesirably disturb the liquid crystal molecules 52 in the vicinity of the spacers 40 and this may cause inappropriate light transmission which may reduce the display quality. However, since the spacers 40 are located above the TFTs 12, such transmitted light is blocked by the black matrix 11 and thus reduction of the display quality is prevented.

Since the spacers 40 do not overlap the pixel electrode 30, even if a pressure is applied on the liquid crystal display device 100 during the production or use thereof, the spacers 40 do not contact the pixel electrode 30. Therefore, the pixel electrode 30 is prevented from being broken or delaminated, which reduces a leak current or variance of the cell thickness.

In this embodiment, when seen in the Z direction, each scanning line 14 overlaps the peripheral portion 36 of the pixel electrode 30. Therefore, the electric field leaking from the scanning line 14 is blocked by the peripheral portion 36. This reduces abnormal alignment of the liquid crystal molecules 52 or generation of flickers in the display area, which realizes high quality display. Since the storage capacitance counter electrode 19 is located also on the scanning line 14, a larger storage capacitance is provided. Since the storage capacitance counter electrode 19 can also block the electric field leaking from the scanning line 14, still higher quality display can be provided.

Figure 7:
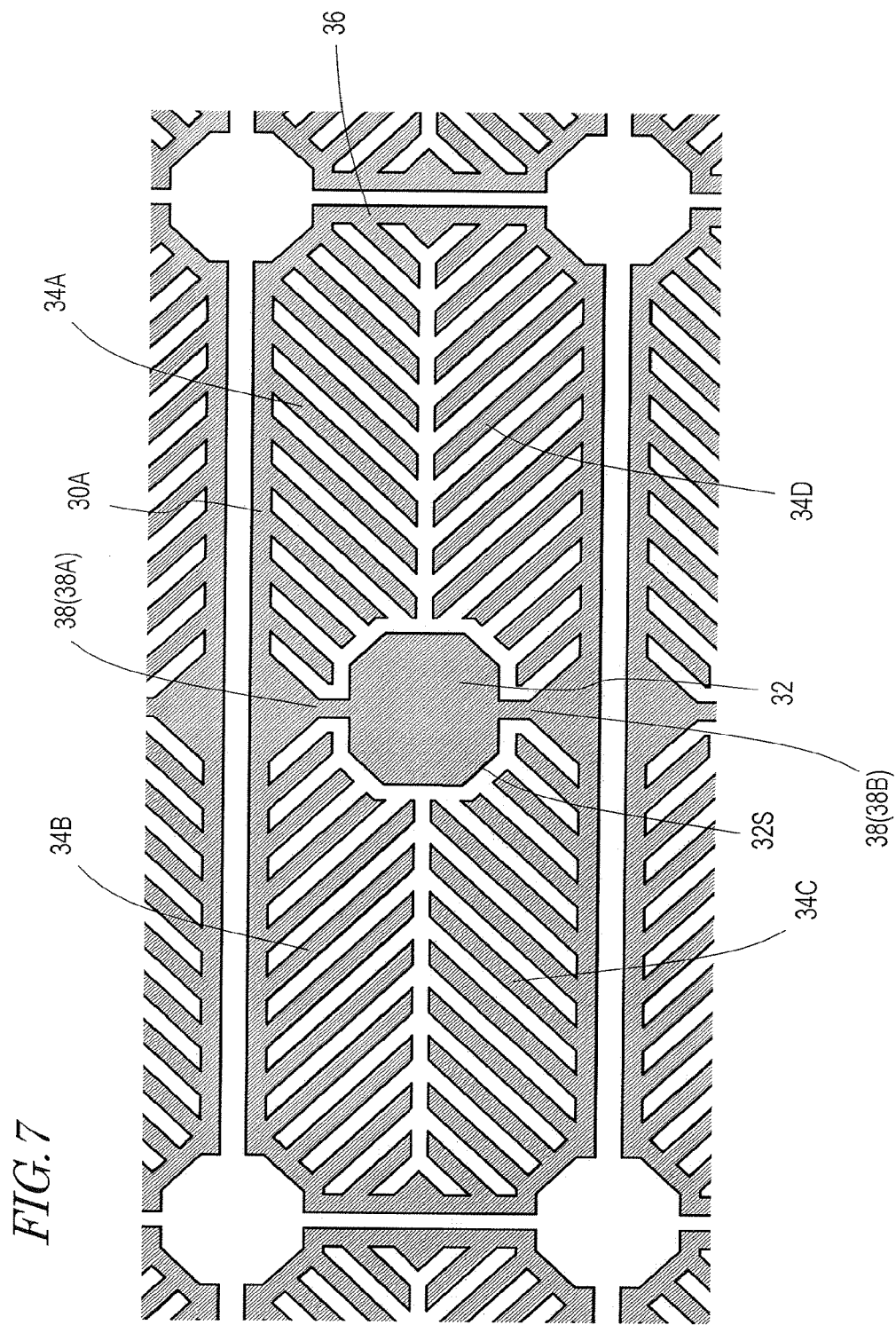
FIG. 7 is a plan view showing a shape of a pixel electrode 30A in a first modification of Embodiment 1.

Now, with reference to FIG. 7, a pixel electrode 30A in a first modification of the liquid crystal display device 100 in Embodiment 1 will be described.

Regarding each of the following modifications and embodiments, identical elements, or elements having identical functions, to those of the liquid crystal display device 100 in Embodiment 1 will bear identical reference signs, and descriptions of these elements and descriptions of the effects provided by these elements will be omitted. The liquid crystal display devices 100 in the modifications and the embodiments include the same elements unless any difference is shown in a figure or described.

The pixel electrode 30A in the first modification includes two connection portions 38A and 38B for electrically connecting the island portion 32 and the peripheral portion 36 to each other. The ends of all the branch portions 34 are separated from the island portion 32. An outer edge of the peripheral portion 36 is surrounded by a gap except for the connection portions 38A and 38B.

When seen in the Z direction, the connection portion 38A and the connection portion 38B are located to be symmetrical to each other with respect to the center of the island portion 32, the center of the pixel electrode 30 or the center of the pixel 50. Therefore, even if slight alignment disturbance occurs by the connection portions 38A and 38B, the amount of alignment disturbance can be uniform among the alignment domains 35A through 35D. Accordingly, the transmittance is relatively uniform among the alignment domains 35A through 35D, which realizes display with a high viewing angle characteristic.

Since the two connection portions 38A and 38B are provided, even if one of the connection portions is broken, all the branch portions 34 can be supplied with a voltage by the other connection portion. This has an advantage that quality inferiority does not occur easily.

Figure 8:
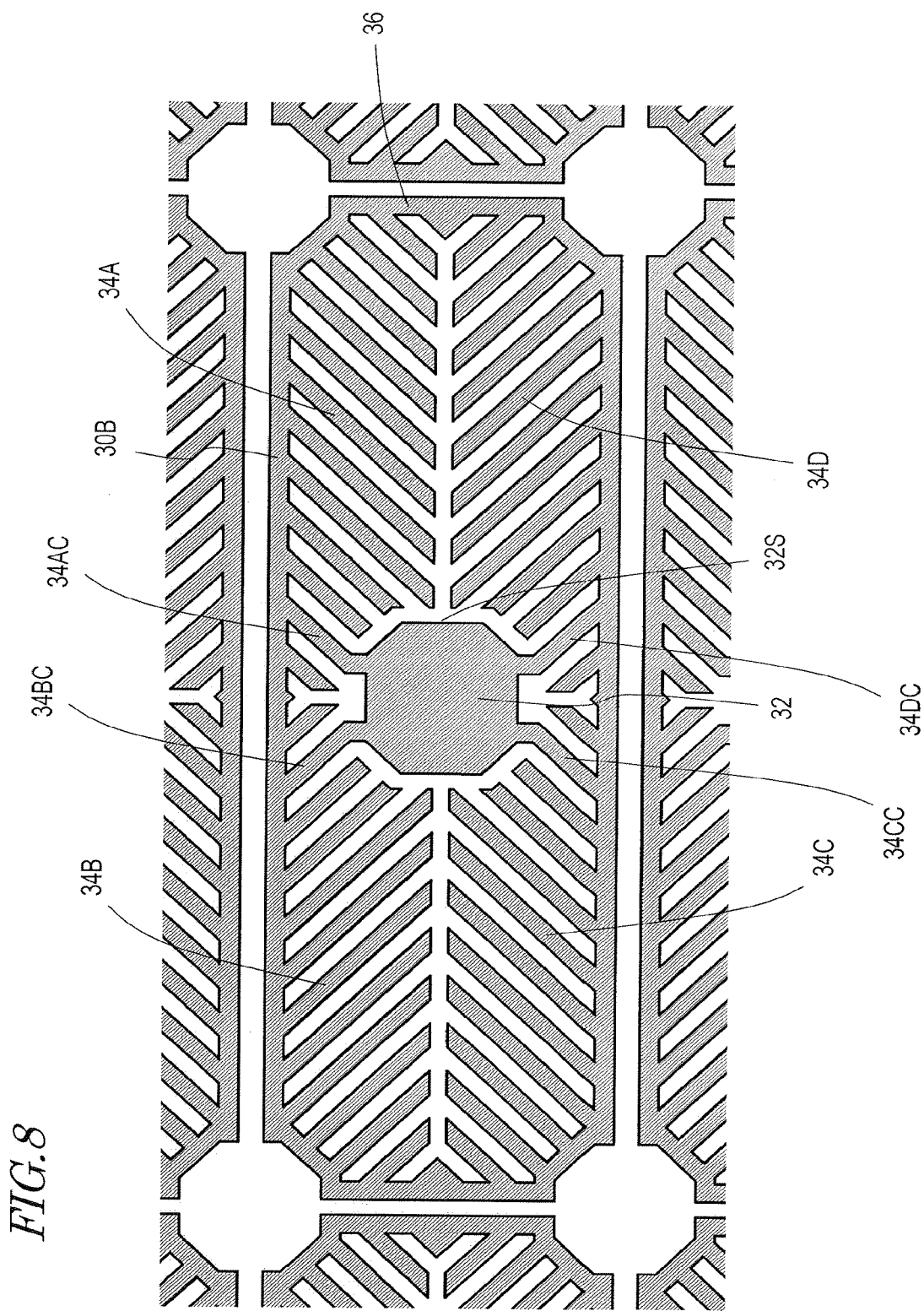
FIG. 8 is a plan view showing a shape of a pixel electrode 30B in a second modification of Embodiment 1.

Now, with reference to FIG. 8, a pixel electrode 30B in a second modification of the liquid crystal display device 100 in Embodiment 1 will be described.

In the pixel electrode 30B in the second modification, the island portion 32 and the peripheral portion 36 are electrically connected to each other by one branch portion 34AC among the first branch portions 34A, one branch portion 34BC among the second branch portions 34B, one branch portion 34CC among the third branch portions 34C, and one branch portion 34DC among the second branch portions 34D.

When seen in the Z direction, the branch portions 34AC and 34BC are formed symmetrically to the branch portions 34CC and 34DC with respect to a line which equally divides the island portion 32 or the pixel 50 into two in the Y direction (central line of the pixel 50 extending in the X direction). The branch portions 34AC and 34DC are formed symmetrically to the branch portions 34BC and 34CC with respect to a line which equally divides the island portion 32 or the pixel 50 into two in the X direction (central line of the pixel 50 extending in the Y direction). By locating the branch portions 34A through 34D symmetrically to each other in this manner, the transmittance can be uniformized among the alignment domains 35A through 35D and thus the viewing angle characteristic can be improved.

In addition, the four branch portions 34AC, 34BC, 34CC and 34DC are in contact with the island portion 32. Therefore, even if one through three among these four branch portions are broken, all the branch portions 34 can be supplied with a voltage by the other branch portion(s). Accordingly, quality inferiority does not occur easily.

Figure 9:
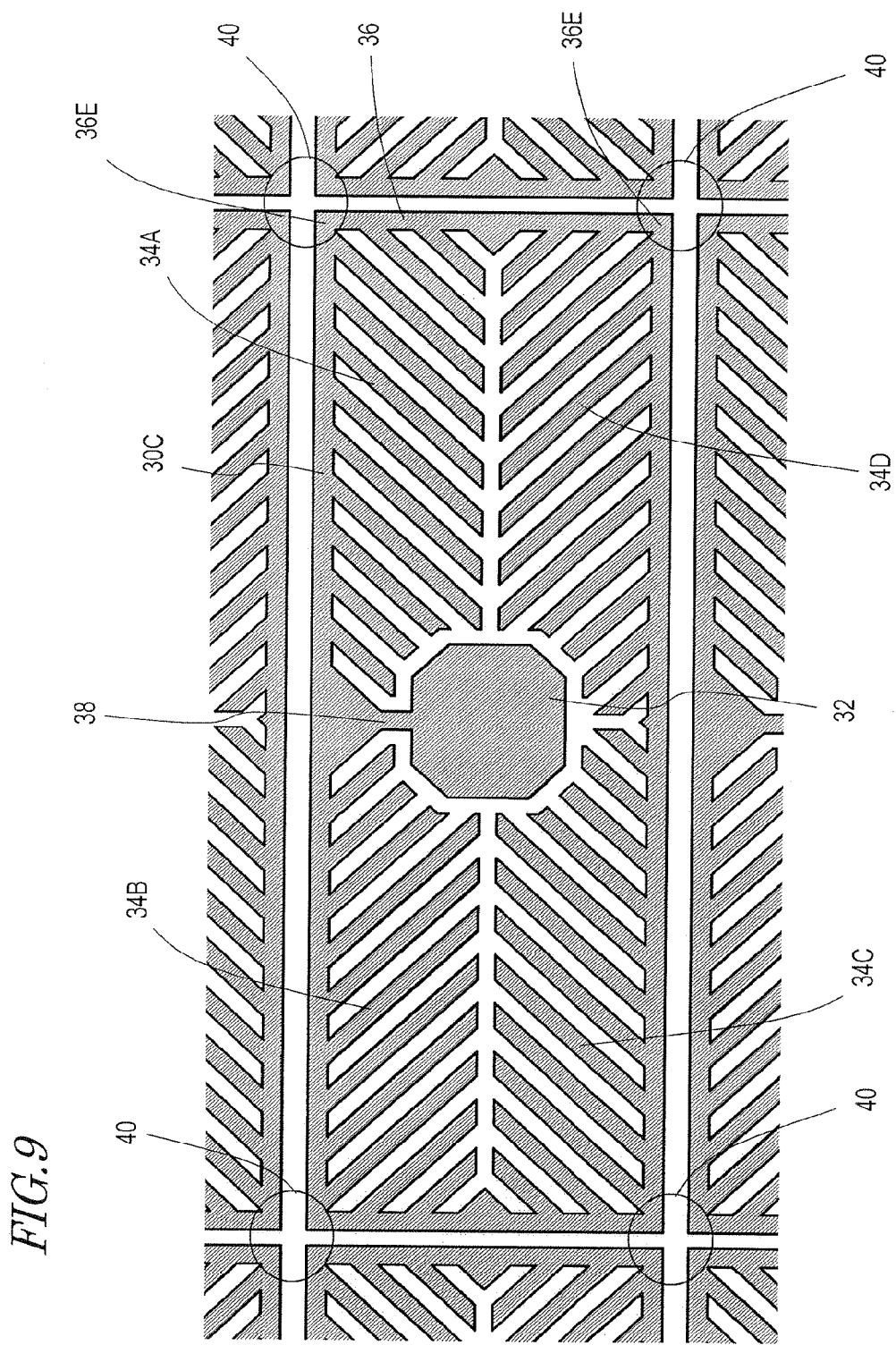
FIG. 9 is a plan view showing a shape of a pixel electrode 30C in a third modification of Embodiment 1.

Now, with reference to FIG. 9, a pixel electrode 30C in a third modification of the liquid crystal display device 100 in Embodiment 1 will be described.

The pixel electrode 30C in the third modification is formed to have a rectangular outer edge. Four corners 36E of the peripheral portion 36 are not recessed unlike in the pixel electrode 30 but are bent at a right angle. When seen in the Z direction, the spacers 40 overlap the corners 36E of the pixel electrode 30C. The pixel electrode 30C has a larger area contributing to display than the pixel electrode 30, and thus can provide display having a higher luminance.

Figure 10:
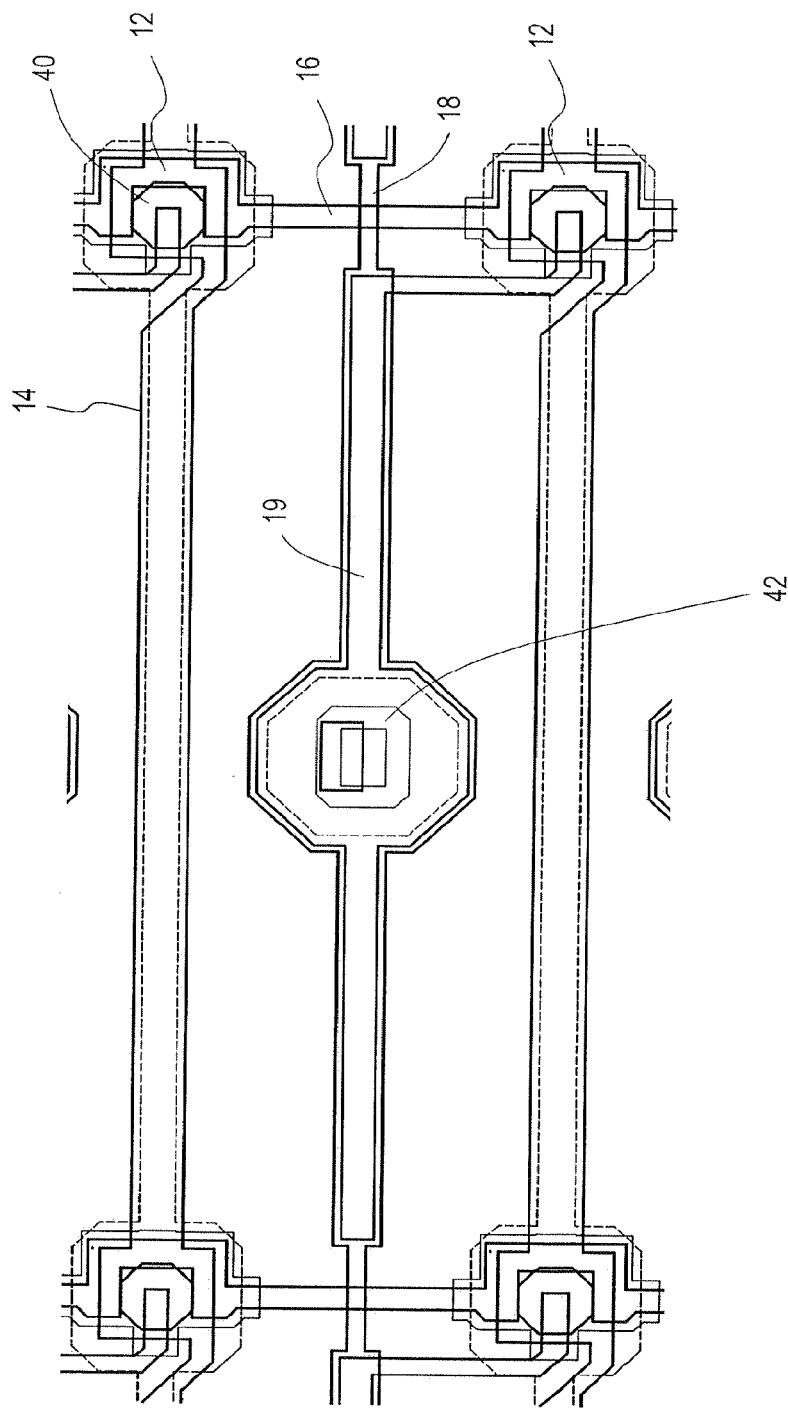
FIG. 10 is a plan view showing a modification of the line configuration of the pixel 50 in Embodiment 1.

Now, with reference to FIG. 10, a modification of the line configuration of the pixel 50 in Embodiment 1 will be described.

In this modification, the storage capacitance counter electrode 19 is mainly formed on the storage capacitance line 18, and is not formed on the scanning line 14 of the pixel 50. In the case where, for example, a liquid crystal display system of inputting an AC signal to the common electrode 25 and inputting a DC signal to the scanning line 14 during a gate-off period of the TFT 12 is adopted, a parasitic capacitance formed by the scanning line 14 and the storage capacitance counter electrode 19 may reduce an effective voltage value during a period in which the voltage is kept in the liquid crystal layer 21. This modification has an advantage that such reduction of the voltage applied to the liquid crystal layer due to the parasitic capacitance can be suppressed. In addition, this modification can reduce the load on the scanning line 14 and thus can contribute to reduction of the power consumption.

Figure 11:
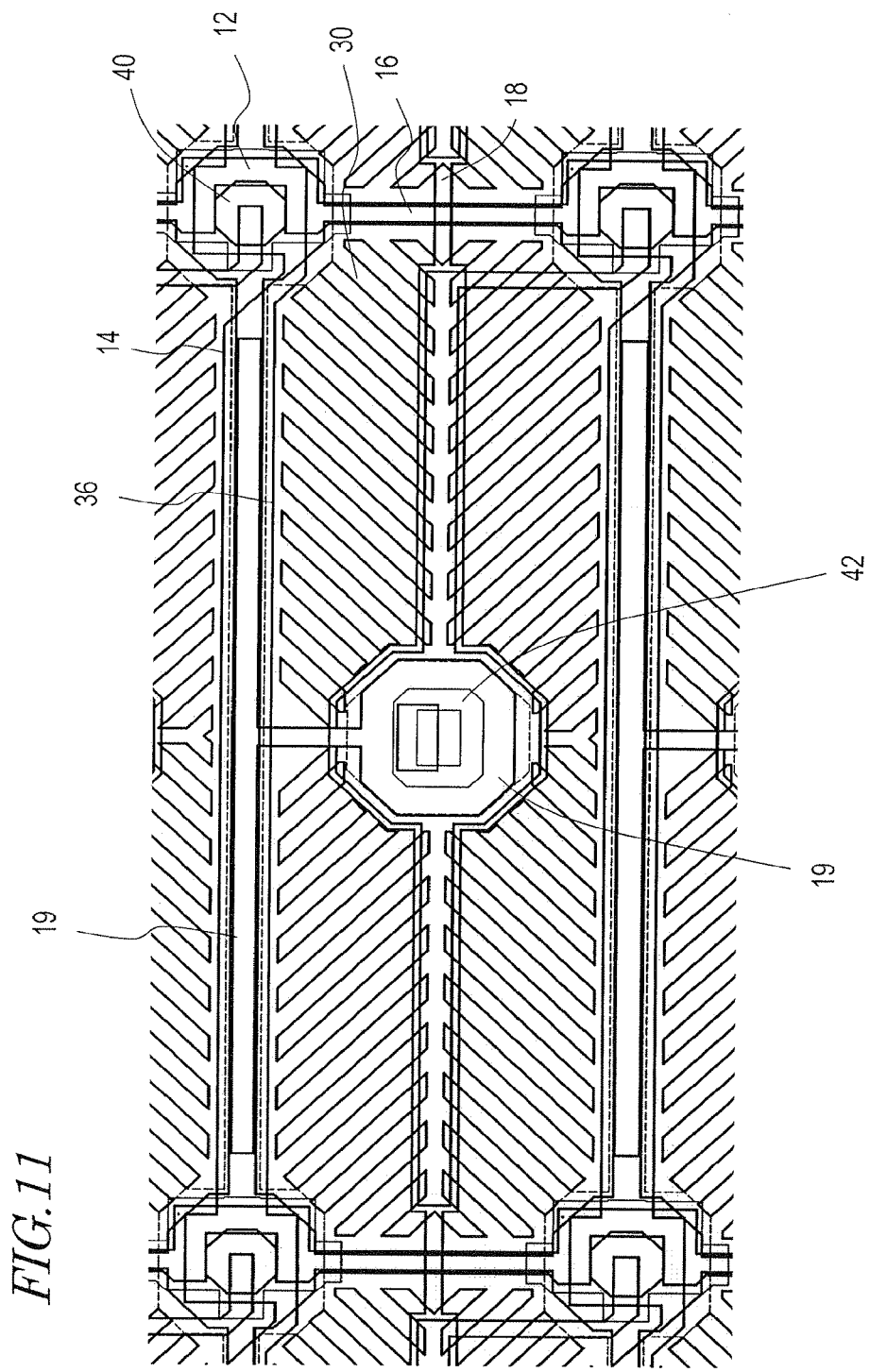
FIG. 11 is a plan view showing a modification of the structure of the pixel 50 in Embodiment 1.

Now, with reference to FIG. 11, a modification of the structure of the pixel 50 in Embodiment 1 will be described.

In this modification, the storage capacitance counter electrodes 19 are formed on the storage capacitance line 18 and the scanning line 14. However, when seen in the Z direction, the storage capacitance counter electrode 19 on the scanning line 14 does not overlap the peripheral portion 36 of the pixel electrode 30.

When the storage capacitance counter electrode 19 of one pixel 50 overlaps the pixel electrode 30 of another pixel 50 adjoining the one pixel 50, a relatively large parasitic capacitance as compared with the pixel electrode 30 of the another pixel 50 may be generated. In the case where, for example, a driving system of inverting the polarity of the voltage to be applied to the pixel electrode 30 at every third scanning line 14 is adopted, when the parasitic capacitance is large, there occurs a relatively large difference between the applied voltage kept by the storage capacitance counter electrodes 19 on the two outer scanning lines 14 among the three scanning lines 14 and the applied voltage kept by the storage capacitance counter electrode 19 on the central scanning line 14 among the three scanning lines 14. Especially in the case of a liquid crystal display device in which color filters of three primary colors are arrayed in the Y direction, when there is a difference between the applied voltages kept at different pixels 50, a fault may occur that the gray scales appear to have a tint of a specific color.

According to this modification, the applied voltages kept at the different pixels 50 do not differ easily. Therefore, higher quality display can be provided.

Embodiment 2

Figure 13:
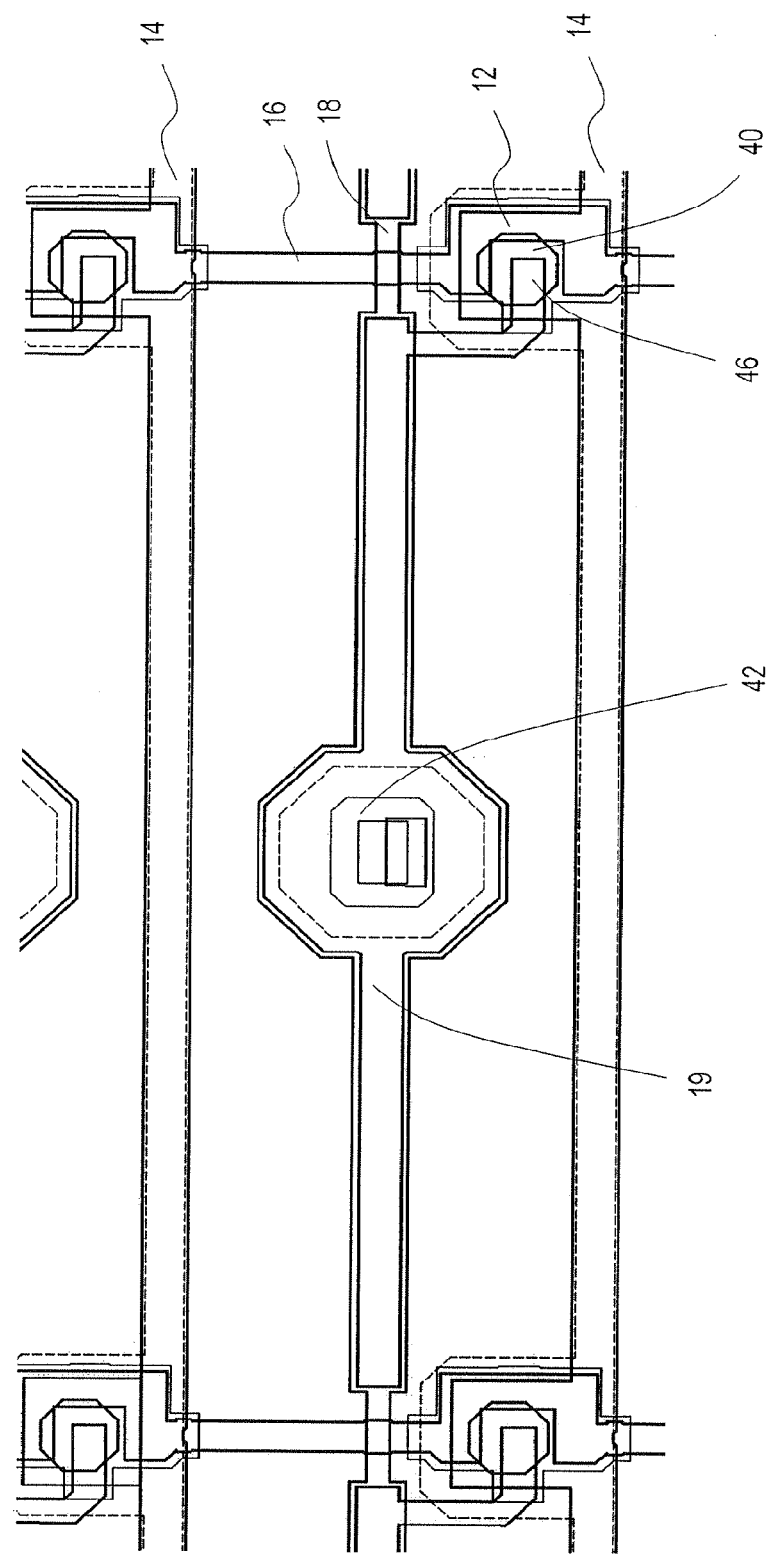
FIG. 13 is a plan view showing a line configuration of the pixel 50 in Embodiment 2.
Figure 14:
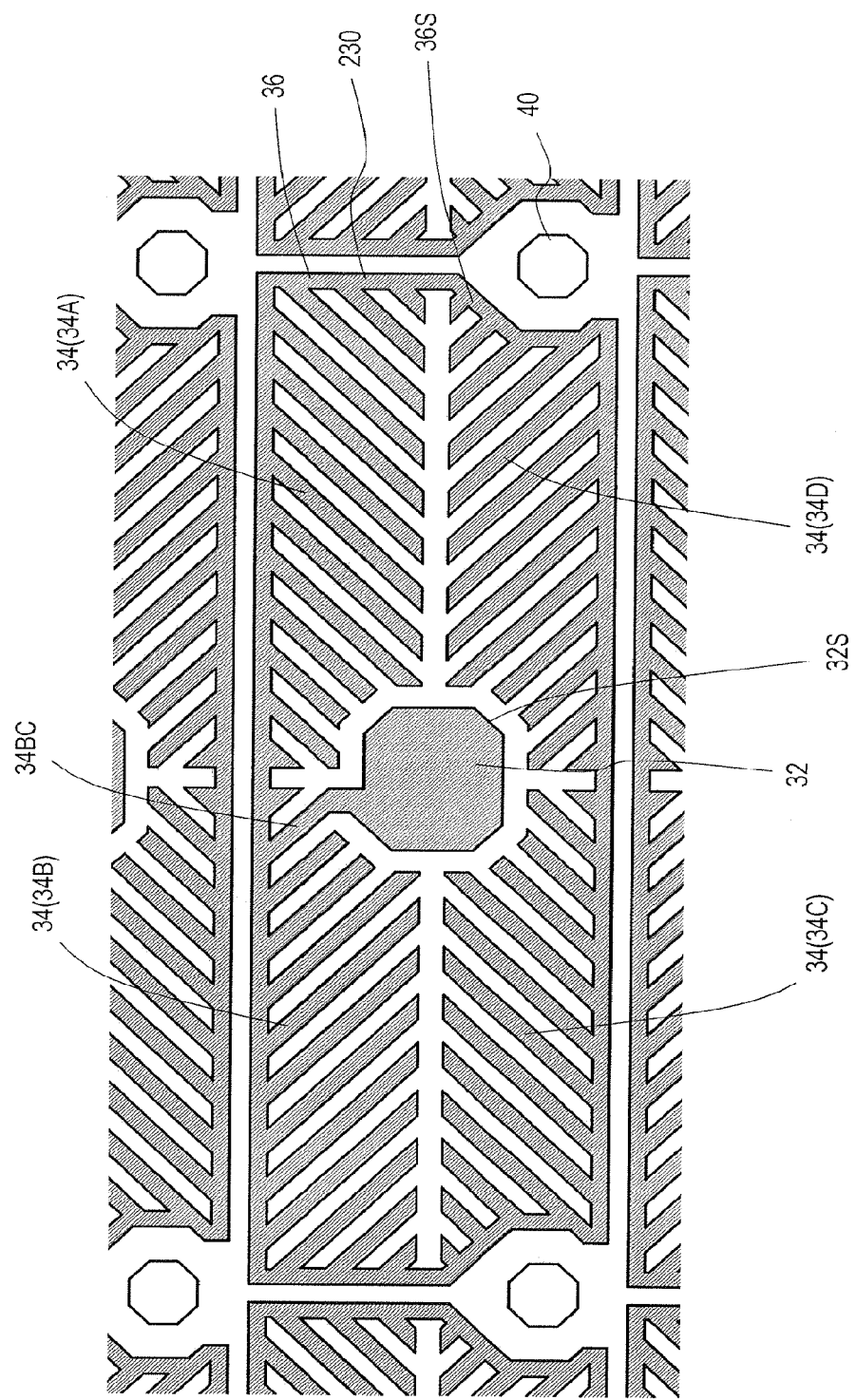
FIG. 14 is a plan view showing a shape of a pixel electrode 230 in Embodiment 2.

Now, with reference to FIG. 12 through FIG. 14, a liquid crystal display device 100 in Embodiment 2 according to the present invention will be described.

Figure 12:
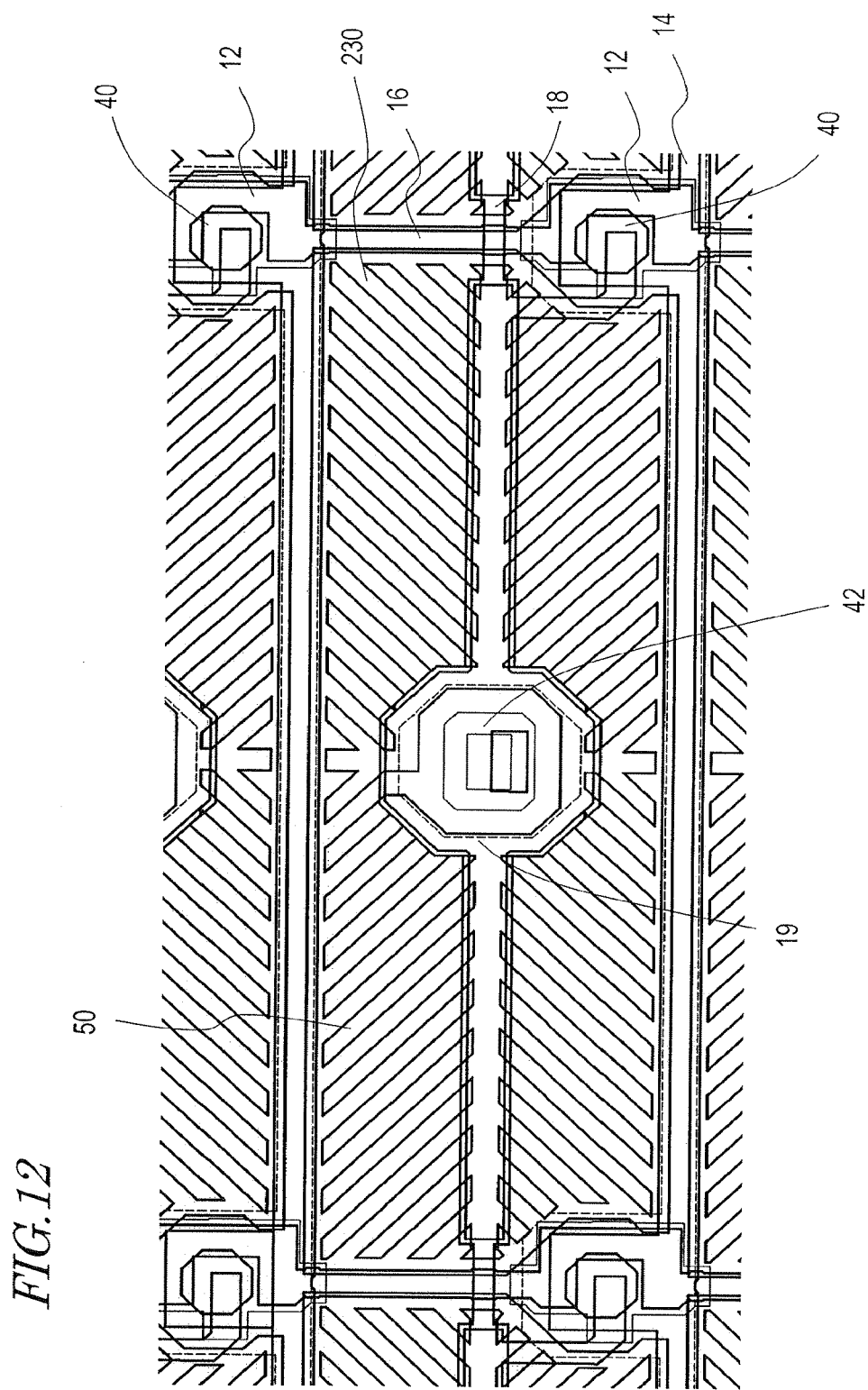
FIG. 12 is a plan view showing a structure of a pixel 50 of a liquid crystal display device 100 in Embodiment 2 according to the present invention.

FIG. 12 is a plan view showing a structure of a pixel 50 of the liquid crystal display device 100 in Embodiment 2. FIG. 13 is a plan view showing a line configuration of the pixel 50 in Embodiment 2. FIG. 14 is a plan view showing a shape of a pixel electrode 230 in Embodiment 2.

The pixel electrode 230 in Embodiment 2 does not include the connection portion 38 included in the pixel electrode 30 in Embodiment 1, and the island portion 32 is connected to the peripheral portion 36 by only one branch portion 34BC among the second branch portions 34B. Since the connection portion 38 is not formed, the area of the pixel which contributes to display can be increased. Therefore, display having a higher luminance is realized. The one branch portion which connects the island portion 32 and the peripheral portion 36 to each other does not need to be one of the second branch portions 34B, and may be one of the first branch portions 34A, one of the third branch portions 34C or one of the fourth branch portions 34D.

In this embodiment, the spacers 40 are located as being shifted by, for example, 7 μm in the Y direction from the spacers 40 in Embodiment 1. In the vicinity of each spacer 40, the peripheral portion 36 includes a portion 36S extending perpendicularly to the direction in which the corresponding branch portions 34 extend. Owing to this, the alignment disturbance of the liquid crystal molecules in the vicinity of the spacer 40 is prevented from being conveyed to the liquid crystal molecules on the pixel electrode 230.

For each two pixels adjoining each other in the Y direction, color filters 13 of different colors are used. A border between such two pixels 50 is a border between two color filters 13 of different colors in the counter substrate 20. In a step of stacking the color filters 13, the color filters 13 of two colors may overlap at the border due to a shift of the stacking positions. When this occurs, a color filter layer having a thickness larger than a prescribed thickness may be formed.

In this embodiment, when seen in the Z direction, the border between the color filters 13 does not overlap the spacer 40. Accordingly, even if a color filter layer having a thickness larger than a prescribed thickness is formed at the border between the color filters 13, this does not make the thickness of the liquid crystal layer 21 larger than a prescribed thickness. Therefore, liquid crystal display devices providing a high display quality can be produced at a high production efficiency. In addition, it is not necessary to form an overcoat film or the like in order to stabilize the layer on which the spacer 40 is to be provided. Therefore, the liquid crystal display devices can be produced at low cost.

The thickness of the liquid crystal layer 21 is about 2.0 μm or greater and about 5.0 μm or less. In the case where, for example, color filters having a thickness of 2.0 μm overlap each other and a spacer 40 is located below the overlapping color filters, there occurs a significant difference in the thickness of the liquid crystal layer 21 and the display quality is deteriorated. In this embodiment, even if the color filters overlap each other, such an adverse influence thereof on the display can be prevented.

Figure 15:
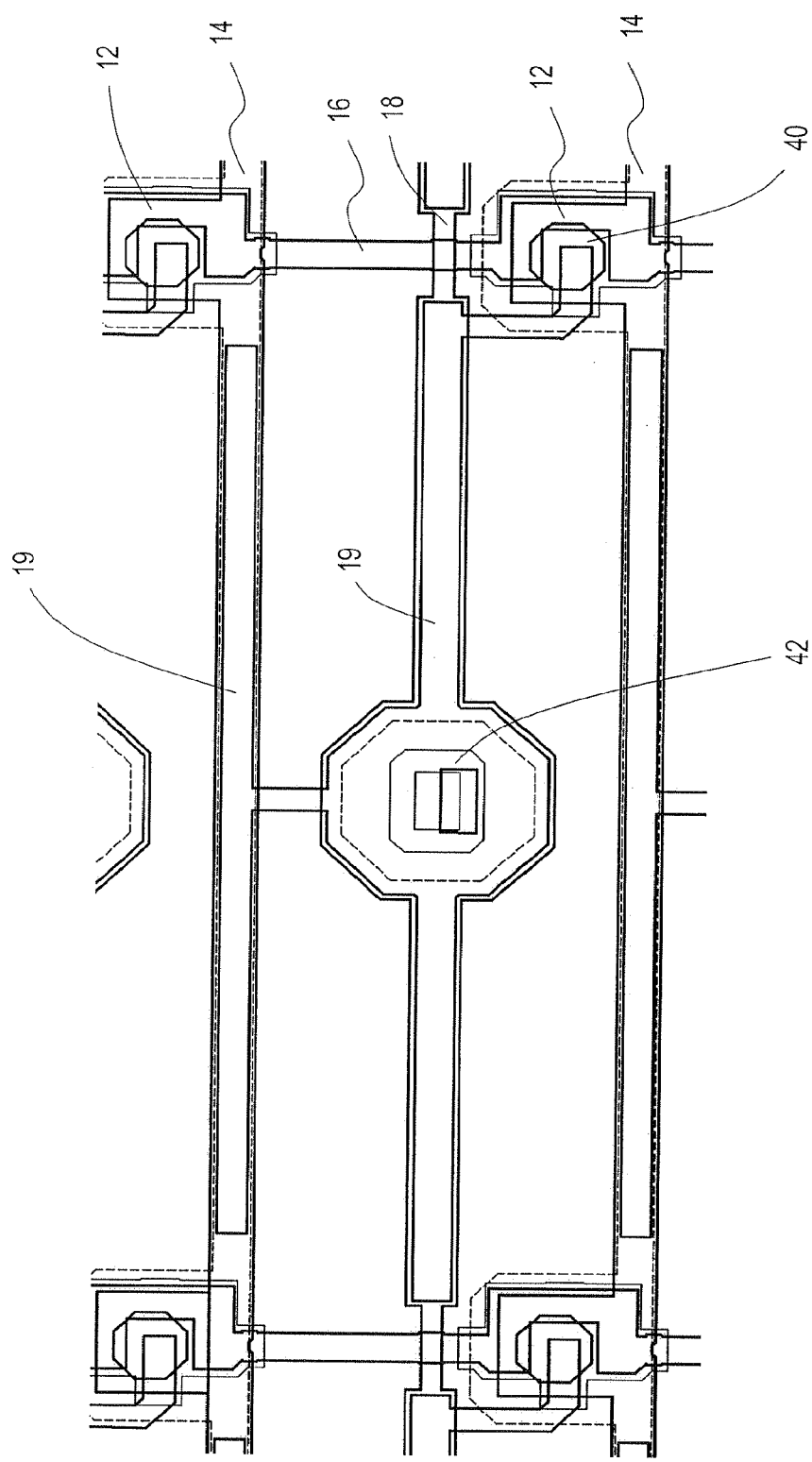
FIG. 15 is a plan view showing a modification of the line configuration of the pixel 50 in Embodiment 2.

With reference to FIG. 15, a modification of the line configuration of the pixel 50 in Embodiment 2 will be described.

In the liquid crystal display device 100 in Embodiment 2, the storage capacitance counter electrode 19 is not formed on the scanning line 14. By contrast, according to the line configuration of this modification, the storage capacitance counter electrodes 19 are formed on the scanning line 14 and the storage capacitance line 18 as in Embodiment 1.

Embodiment 3

Now, with reference to FIG. 16 through FIG. 19, a liquid crystal display device 100 in Embodiment 3 according to the present invention will be described.

Figure 16:
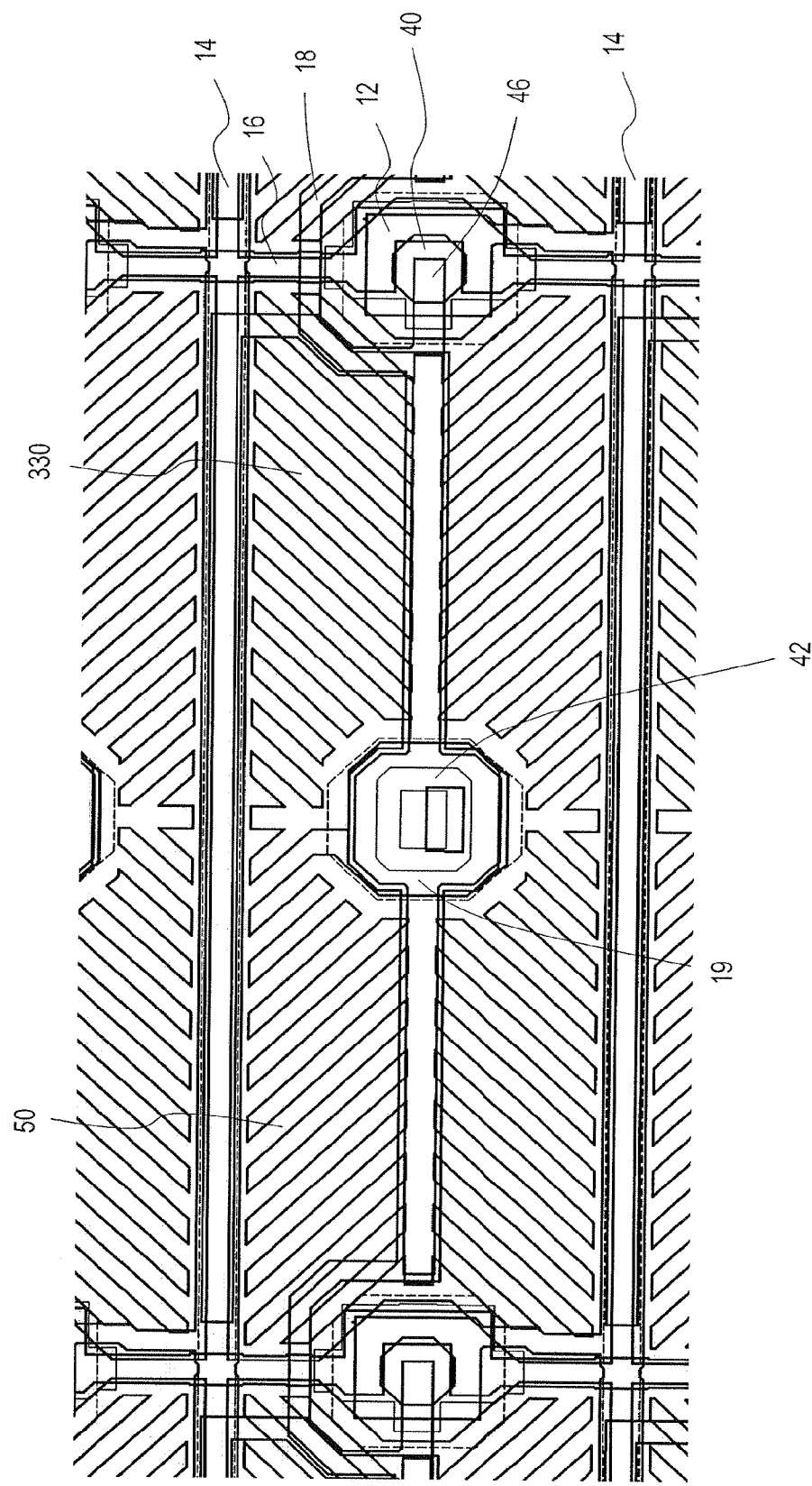
FIG. 16 is a plan view showing a structure of a pixel 50 of a liquid crystal display device 100 in Embodiment 3 according to the present invention.
Figure 17:
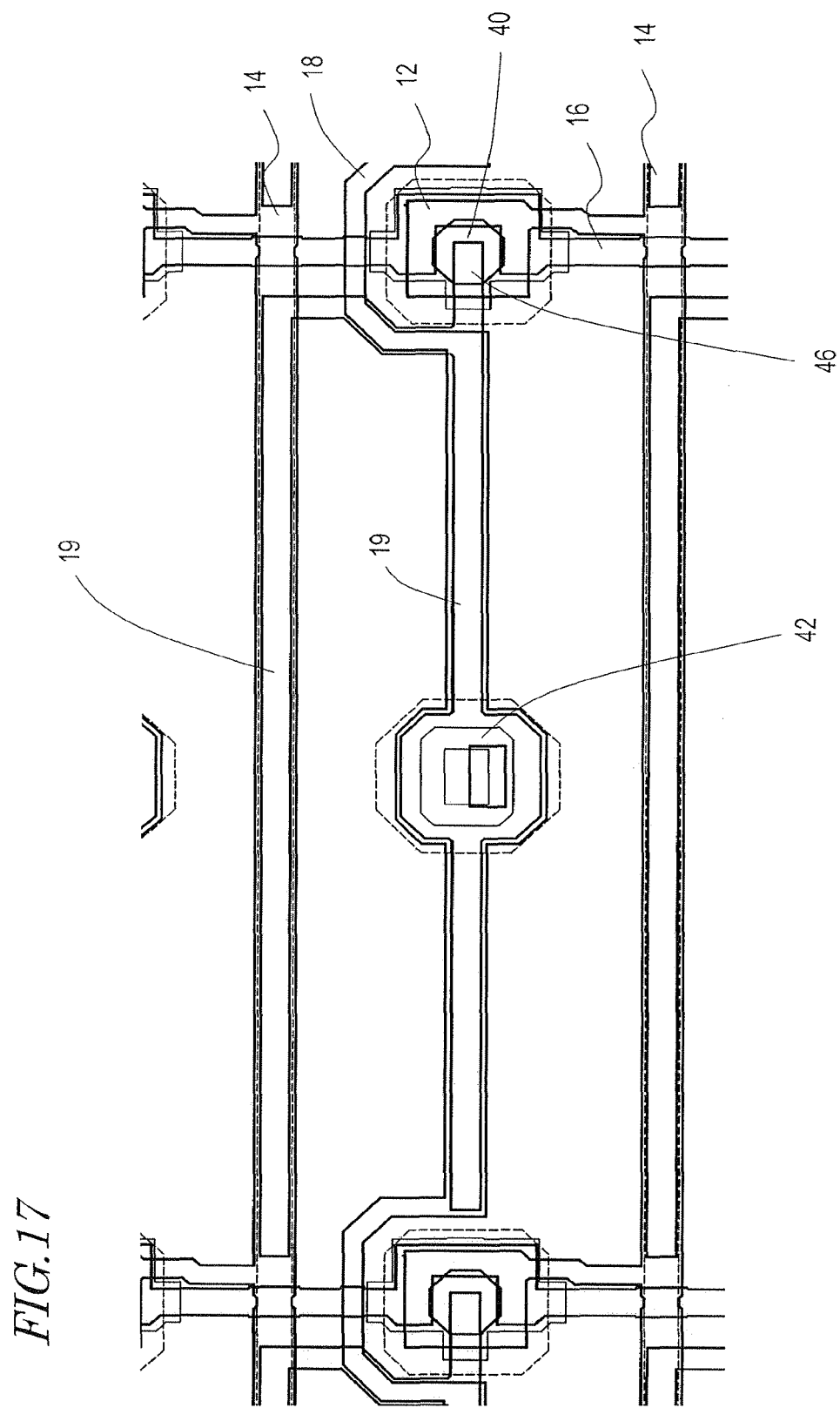
FIG. 17 is a plan view showing a line configuration of the pixel 50 in Embodiment 3.
Figure 18:
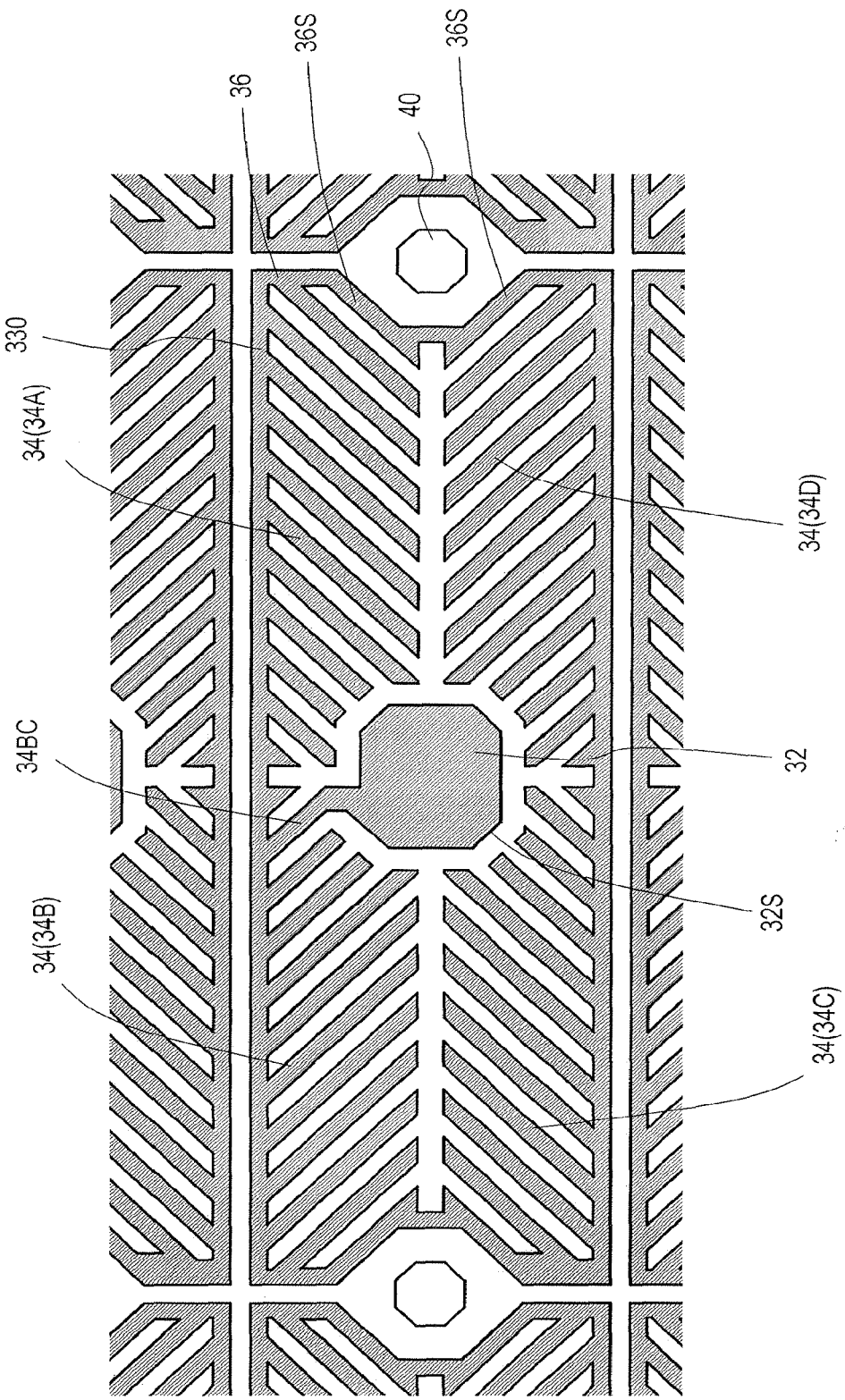
FIG. 18 is a plan view showing a shape of a pixel electrode 330 in Embodiment 3.
Figure 19:
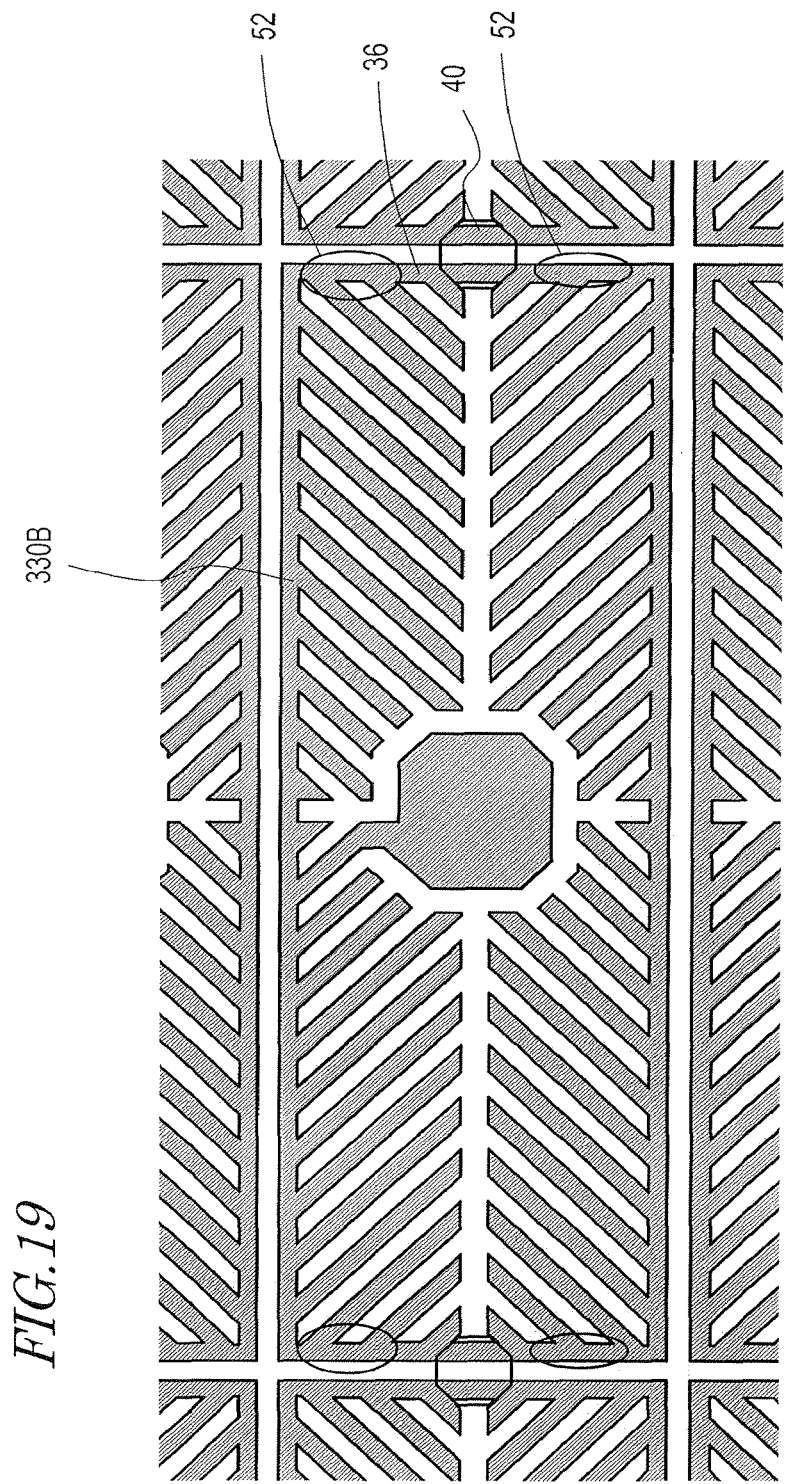
FIG. 19 is a plan view showing a shape of a pixel electrode 330B, which is a comparative example to the pixel electrode 330 in Embodiment 3.

FIG. 16 is a plan view showing a structure of a pixel 50 of the liquid crystal display device 100 in Embodiment 3. FIG. 17 is a plan view showing a line configuration of the pixel 50 in Embodiment 3. FIG. 18 is a plan view showing a shape of a pixel electrode 330 in Embodiment 3. FIG. 19 is a plan view showing a shape of a pixel electrode 330B, which is an comparative example to the pixel electrode 330.

In the pixel 50 in Embodiment 3, the spacer 40 is located at a central position of each of two sides of the pixel 50 extending in the Y direction. The storage capacitance line 18 bypasses so as not to pass below the TFT 12. The storage capacitance counter electrode 19 on the storage capacitance line 18 and the storage capacitance counter electrode 19 on the scanning line 14 are connected to each other on the right side among the four sides of the pixel 50. Except for these points, this embodiment basically has the same structure as that of Embodiment 2, and provides the same effects as those of Embodiment 2. Since the pixel electrode 330 can have a shape in which a top half and a bottom half are symmetrical to each other, display with little viewing angle dependence can be provided.

The pixel electrode 330B shown in FIG. 19 as a comparative example does not have a recessed portion in the vicinity of each spacer 40. Therefore, the liquid crystal molecules 52 in the vicinity of the right and left sides among the four sides of the pixel electrode 330B are easily aligned along the top-bottom direction (toward the spacers 40) by the influence of the spacers 40. Since this direction is different from the alignment direction of the liquid crystal molecules regulated by the branch portions 34, the transmittance is reduced.

In this embodiment, the peripheral portion 36 has the plurality of portions 36S mentioned above, and there is a gap between each spacer 40 and the peripheral portion 36. Therefore, the liquid crystal molecules are not disturbed easily and thus display having a higher luminance is realized. In a comparison conducted by use of 4.3-type liquid crystal display devices (dot size: 198 μm×66 μm), a liquid crystal display device using the pixel electrode 330 in this embodiment provided a transmittance 1.5% higher than a liquid crystal display device using the pixel electrode 330B of the comparative example.

Figure 20:
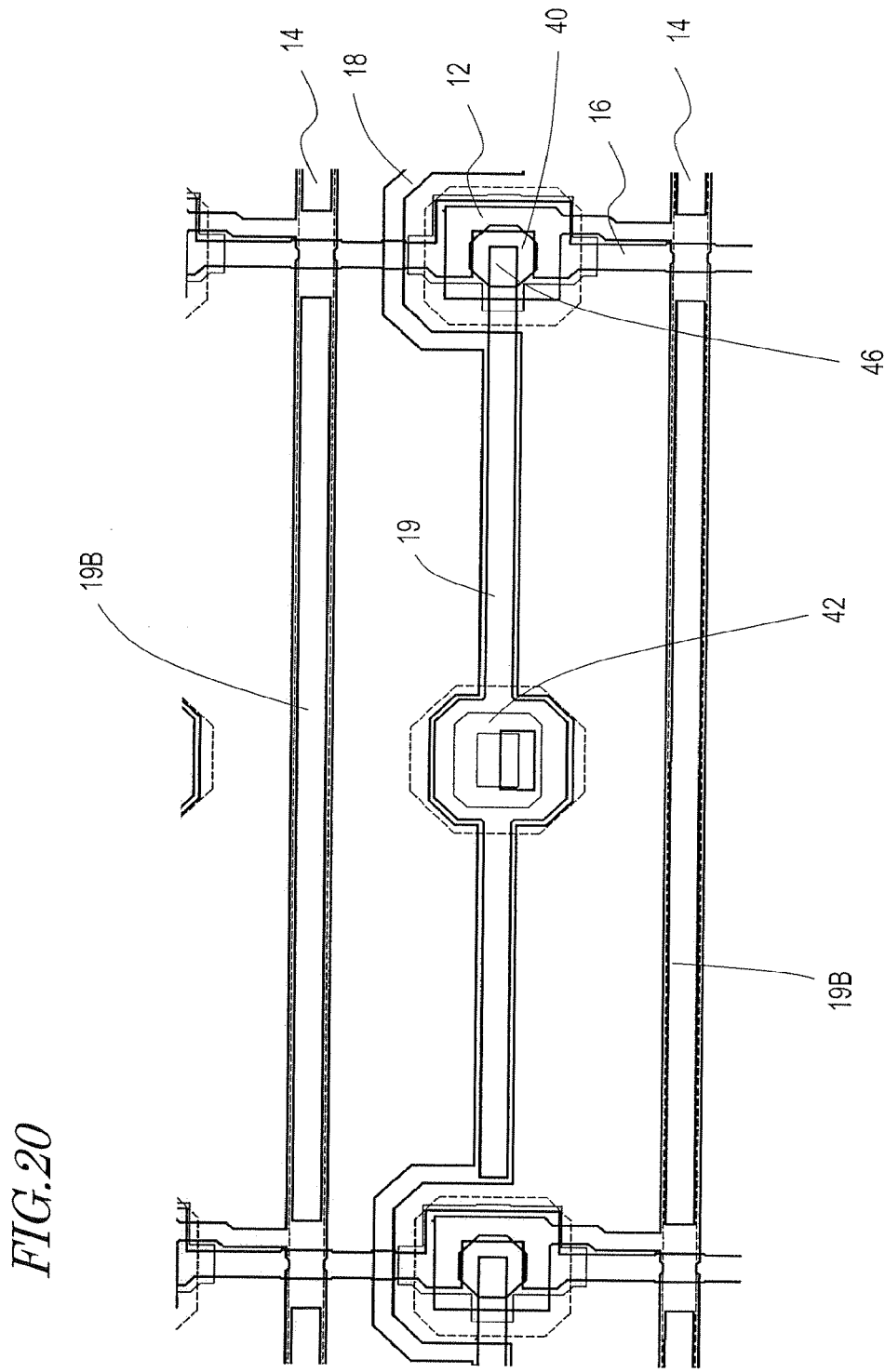
FIG. 20 is a plan view showing a modification of the line configuration of the pixel 50 in Embodiment 3.

Now, with reference to FIG. 20, a modification of the line configuration of the pixel 50 in Embodiment 3 will be described.

According to the line configuration of this modification, the storage capacitance counter electrode 19 connected to the drain electrode 46 is formed on the storage capacitance line 18 but not on the scanning line 14. On the scanning line 14, an electrode 19B electrically separated from the drain electrode 46 and also from the storage capacitance counter electrode 19 is formed.

In the case where a topmost layer of the scanning line 14 is formed of Al or an Al alloy, or in the case where the entire scanning line 14 is formed of a single layer of Al or an Al alloy, external light incident from the counter substrate 20 side may occasionally be reflected by the scanning line 14 to reduce the contrast or cause a tint of a specific color. Such reduction of the display quality caused by external light can be suppressed by providing an opaque film formed of a material having a lower reflectance on the scanning line 14.

Embodiment 4

Figure 22:
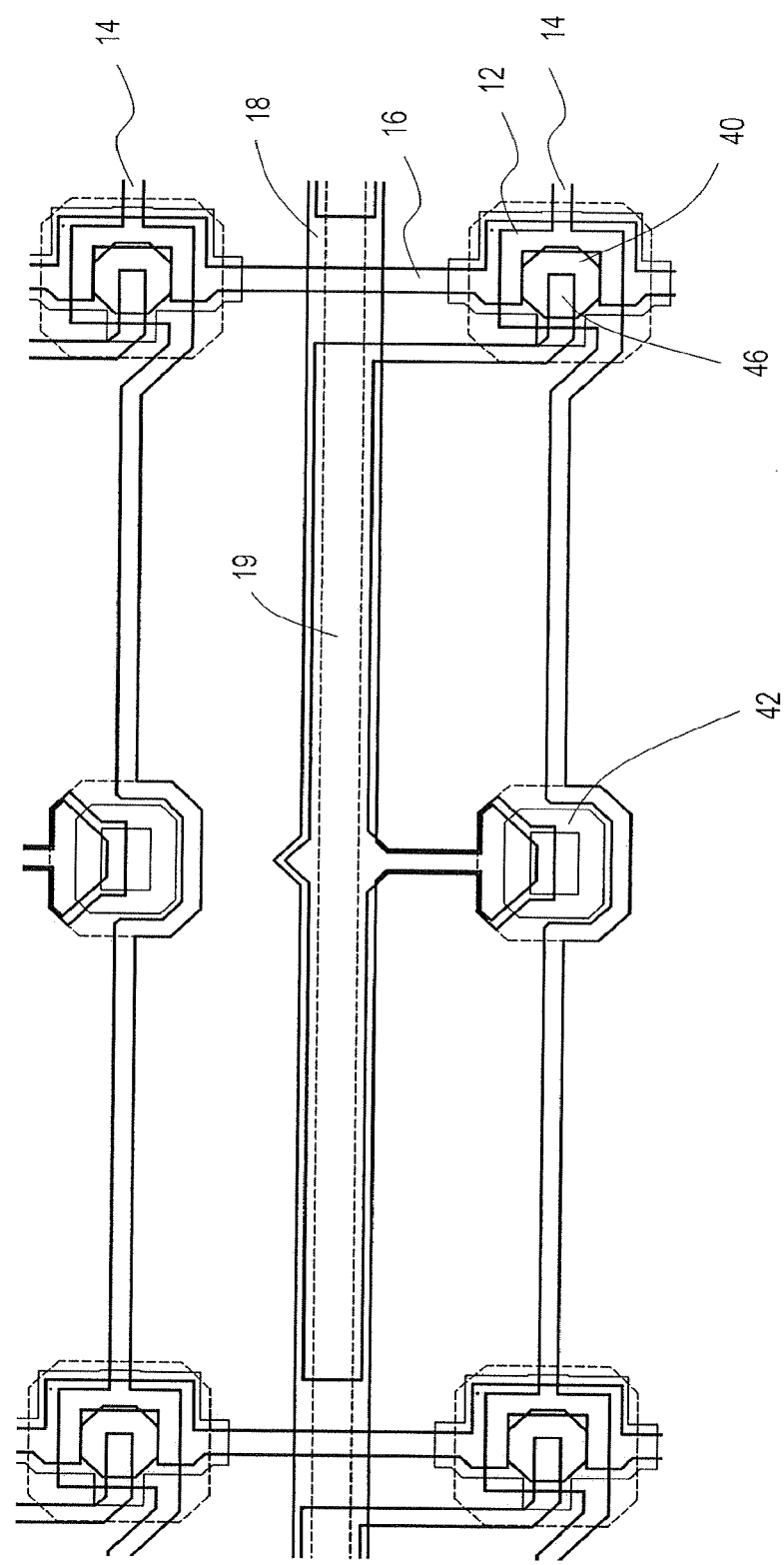
FIG. 22 is a plan view showing a line configuration of the pixel 50 in Embodiment 4.
Figure 23:
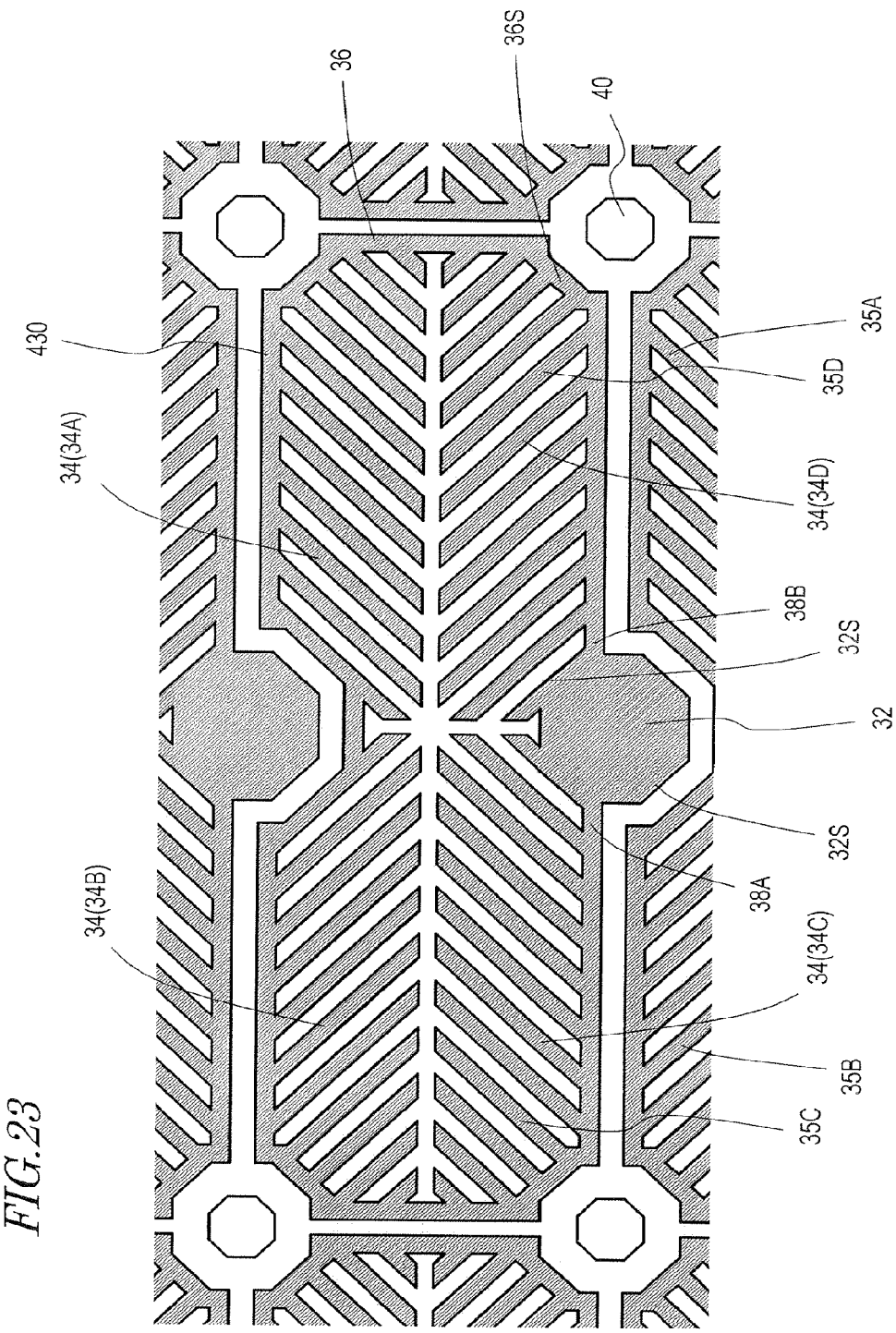
FIG. 23 is a plan view showing a shape of a pixel electrode 430 in Embodiment 4.

Now, with reference to FIG. 21 through FIG. 23, a liquid crystal display device 100 in Embodiment 4 according to the present invention will be described.

Figure 21:
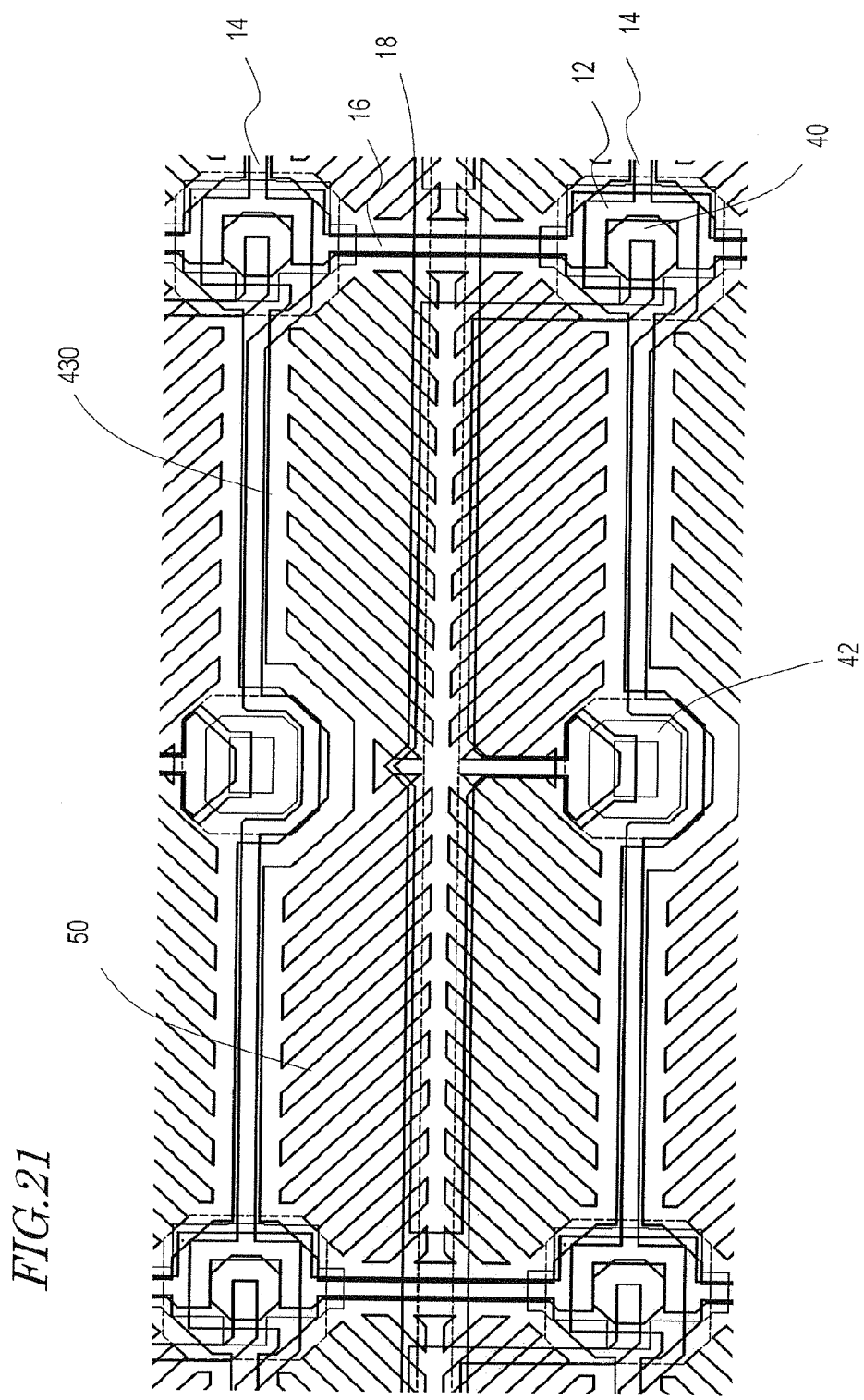
FIG. 21 is a plan view showing a structure of a pixel 50 of a liquid crystal display device 100 in Embodiment 4 according to the present invention.

FIG. 21 is a plan view showing a structure of a pixel 50 of the liquid crystal display device 100 in Embodiment 4. FIG. 22 is a plan view showing a line configuration of the pixel 50 in Embodiment 4. FIG. 23 is a plan view showing a shape of a pixel electrode 430 in Embodiment 4.

In Embodiment 4, the island portion 32 and the contact hole 42 are formed at a position which is in the vicinity of a border between each two pixel electrodes 430 adjoining each other in the Y direction and also is in the vicinity of the center of the pixels 50 in the X direction. The island portion 32 is surrounded by four regions, namely, the third region 35C and the fourth region 35D of a pixel 50 (first pixel) and the first region 35A and the second region 35B of a pixel 50 (second pixel) adjoining to the first pixel in the Y direction.

Ends of all the branch portions 34 opposite to the peripheral portion 36 are separated from the island portion 32, and the peripheral portion 36 and the island portion 32 are directly connected to each other at two positions. Herein, these two positions will be referred to as the connection portions 38A and 38B.

When seen in the Z direction, the outer edge 32S of the island portion 32 includes a first edge facing the first region 35A of the second pixel, a second edge facing the second region 35B of the second pixel, a third edge facing the third region 35C of the first pixel, and a fourth edge facing the fourth region 35D of the first pixel. The first edge includes a portion extending along the first branch portions 34A, the second edge includes a portion extending along the second branch portions 34B, the third edge includes a portion extending along the third branch portions 34C, and the fourth edge includes a portion extending along the fourth branch portions 34D.

Accordingly, a desired alignment of the liquid crystal molecules is also provided by the outer edge 32S of the island portion 32. As a result, high quality display in which the alignment disturbance of the liquid crystal molecules caused by the outer edge 32S is suppressed is realized. Since the island portion 32 and the peripheral portion 36 do not have a narrow connection portion therebetween, there is an advantage that the lines for the pixel electrode 430 are not broken easily.

Embodiment 5

Now, with reference to FIG. 24 and FIG. 25, a liquid crystal display device 100 in Embodiment 5 according to the present invention will be described.

Figure 24:
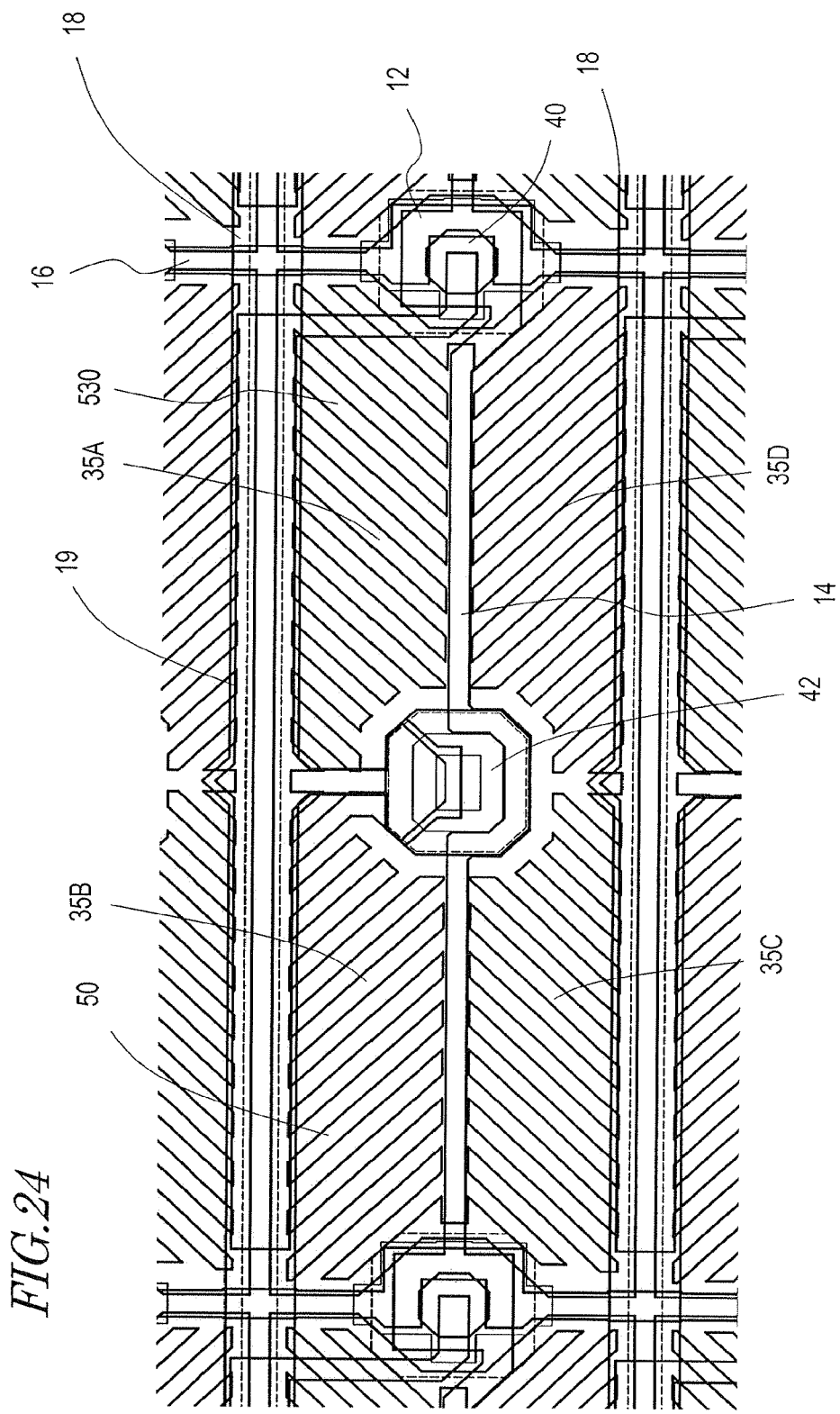
FIG. 24 is a plan view showing a structure of a pixel 50 of a liquid crystal display device 100 in Embodiment 5 according to the present invention.
Figure 25:
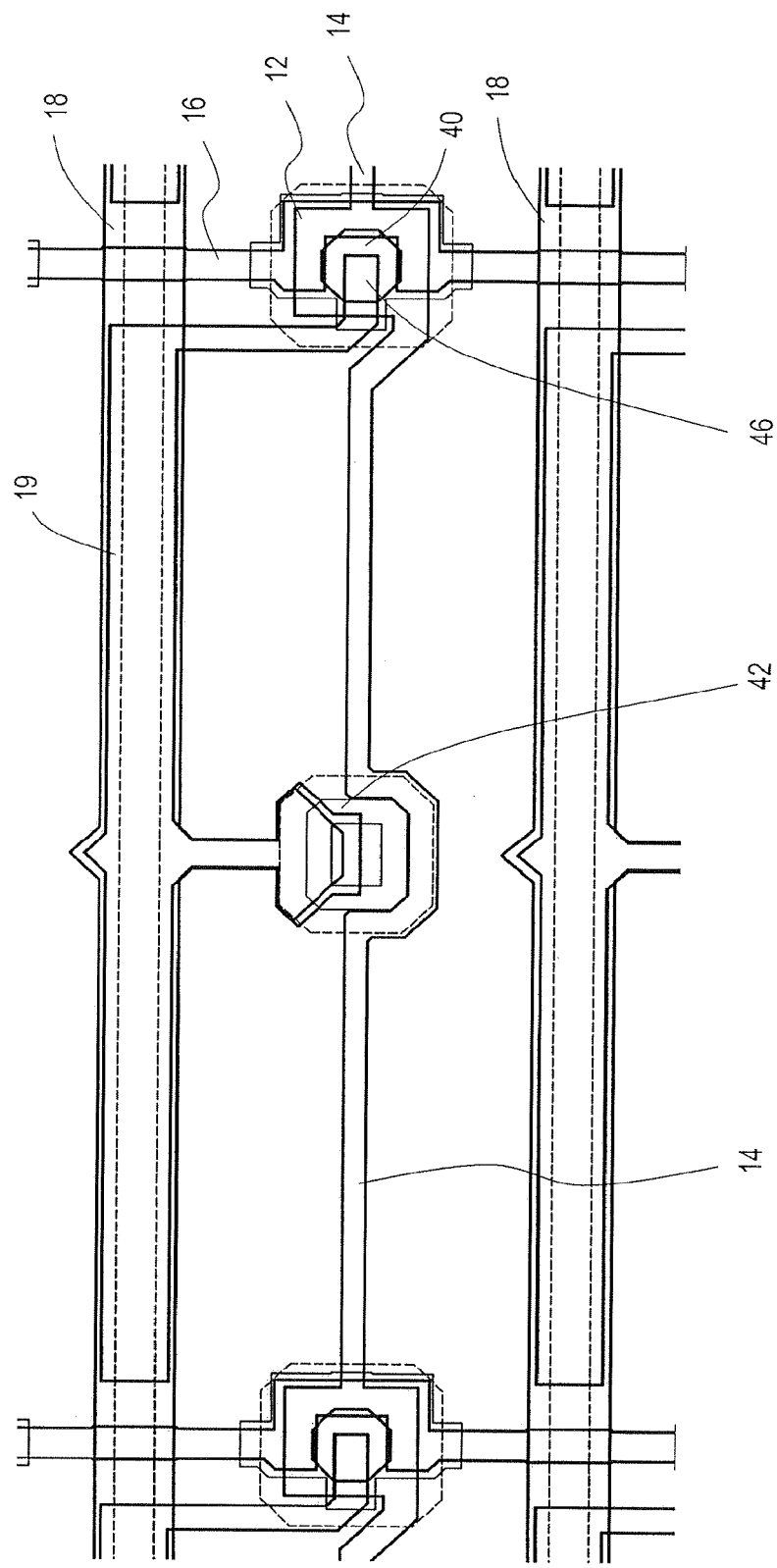
FIG. 25 is a plan view showing a line configuration of the pixel 50 in Embodiment 5.

FIG. 24 is a plan view showing a structure of a pixel 50 of the liquid crystal display device 100 in Embodiment 5. FIG. 25 is a plan view showing a line configuration of the pixel 50 in Embodiment 5.

In the liquid crystal display device 100 in Embodiment 5, the scanning line 14 extends in the X direction through the center of the pixel 50, and the storage capacitance line 18 extends in the X direction along a border between each two pixels 50 adjoining each other in the Y direction. The storage capacitance counter electrode 19 is formed on the storage capacitance line 18.

According to this line configuration, a trunk slit of the pixel electrode 530 is located above the scanning line 14. Therefore, the load on the scanning line 14 can be alleviated, which contributes to reduction of the power consumption. The form of any of the pixel electrodes described in Embodiments 1 through 3 may be applied to this embodiment.

The location arrangement of the spacers 40 in this embodiment is the same as that in Embodiment 3, and thus is not described. Any of the location arrangements of the spacers 40 described in Embodiments 1 and 2 may be applied to this embodiment.

Embodiment 6

Now, with reference to FIG. 26 through FIG. 28, a liquid crystal display device 100 in Embodiment 6 according to the present invention will be described.

Figure 26:
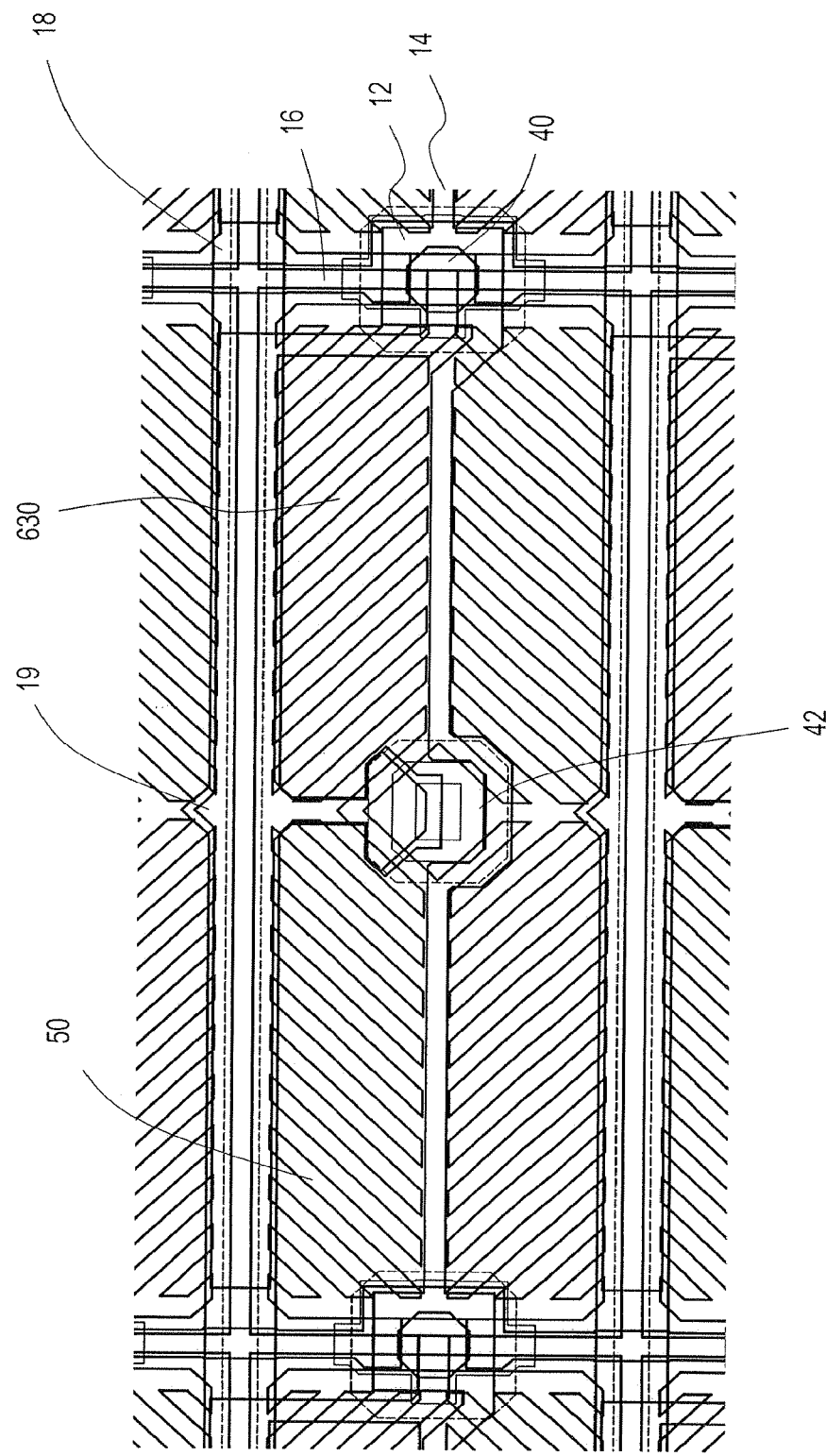
FIG. 26 is a plan view showing a structure of a pixel 50 of a liquid crystal display device 100 in Embodiment 6 according to the present invention.
Figure 27:
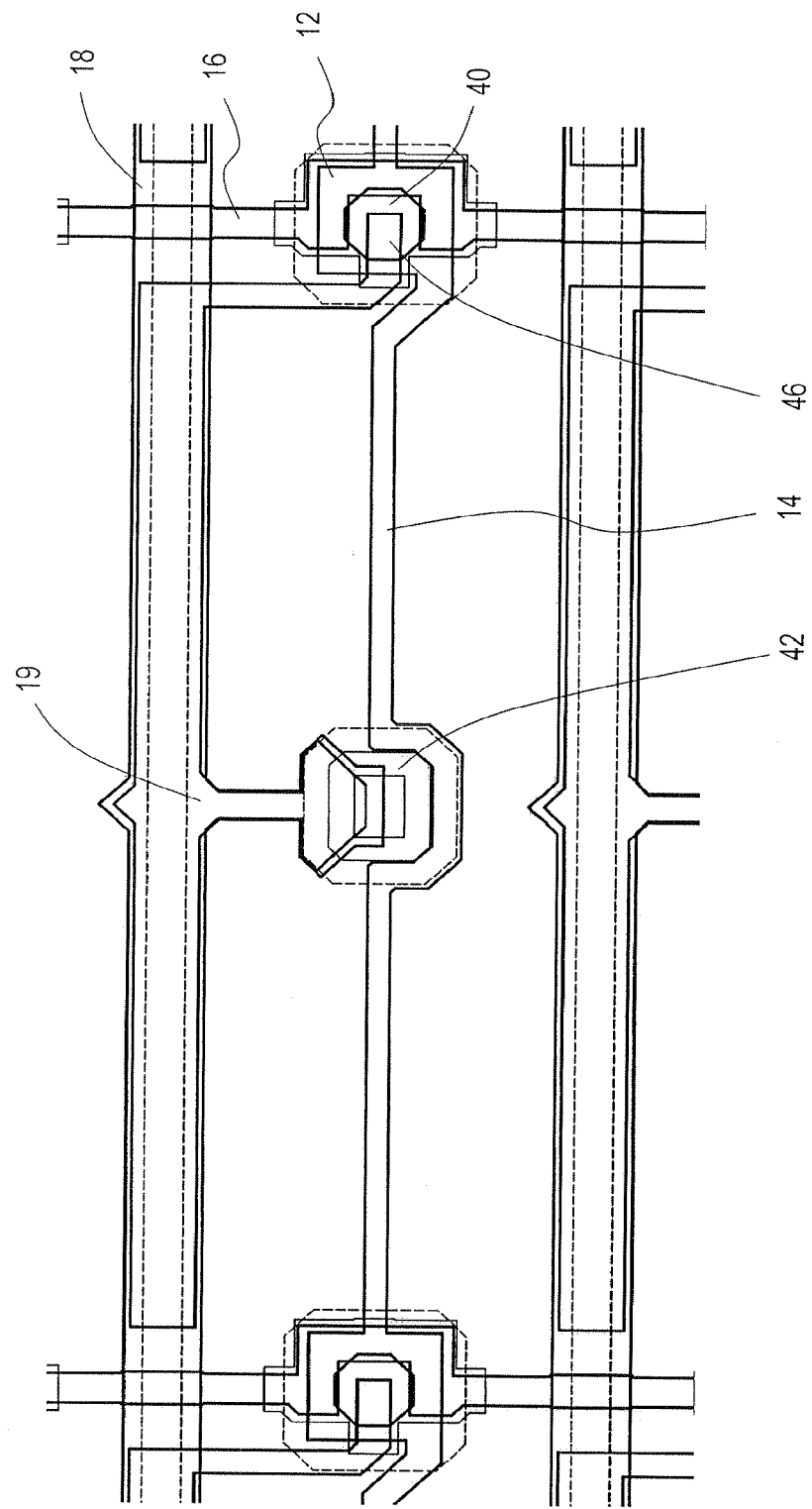
FIG. 27 is a plan view showing a line configuration of the pixel 50 in Embodiment 6.

FIG. 26 is a plan view showing a structure of a pixel 50 of the liquid crystal display device 100 in Embodiment 6. FIG. 27 is a plan view showing a line configuration of the pixel 50 in Embodiment 6. FIG. 28 is a plan view showing a shape of a pixel electrode 630 in Embodiment 6.

The pixel electrode 630 includes a peripheral portion 36, an island portion 32, and a plurality of branch portions 34 extending from the peripheral portion 36 inward in the pixel 50. The plurality of branch portions 34 are formed of a plurality of first branch portions 34A extending in a direction of 315° from the peripheral portion 36, a plurality of second branch portions 34B extending in a direction of 225° from the peripheral portion 36, a plurality of third branch portions 34C extending in a direction of 135° from the peripheral portion 36, and a plurality of fourth branch portions 34D extending in a direction of 45° from the peripheral portion 36.

The island portion 32 is generally square, and is connected to the peripheral portion 36 by one connection portion 38 but not by any of the plurality of branch portions 34. An outer edge 32S of the island portion 32 includes four ends respectively extending parallel to the branch portions 34A through 34D. Accordingly, a desired alignment of the liquid crystal molecules is also provided by the outer edge 32S. As a result, the alignment disturbance caused by the presence of the island portion 32 can be significantly suppressed.

In order to provide high quality display having a high transmittance with no coarseness, it is more preferable that the island portion 32 is smaller. In this embodiment, the interlayer insulating film 44 has a thickness of 3.0 μm. The contact hole 42 has a size of 10.5 μm×7.5 μm when seen in the Z direction. Each of the straight line portions of the outer edge 32S has a length of 18.0 μm. The island portion 32 may be formed to be smaller by forming the interlayer insulating film 44 to be thinner and making the contact hole 42 smaller. For example, the thickness of the interlayer insulating film 44 may be 1.0 μm, the size of the contact hole may be 4.0 μm×4.0 μm, and the length of each of the straight line portions of the outer edge 32S may be 8.0 μm.

Figure 29:
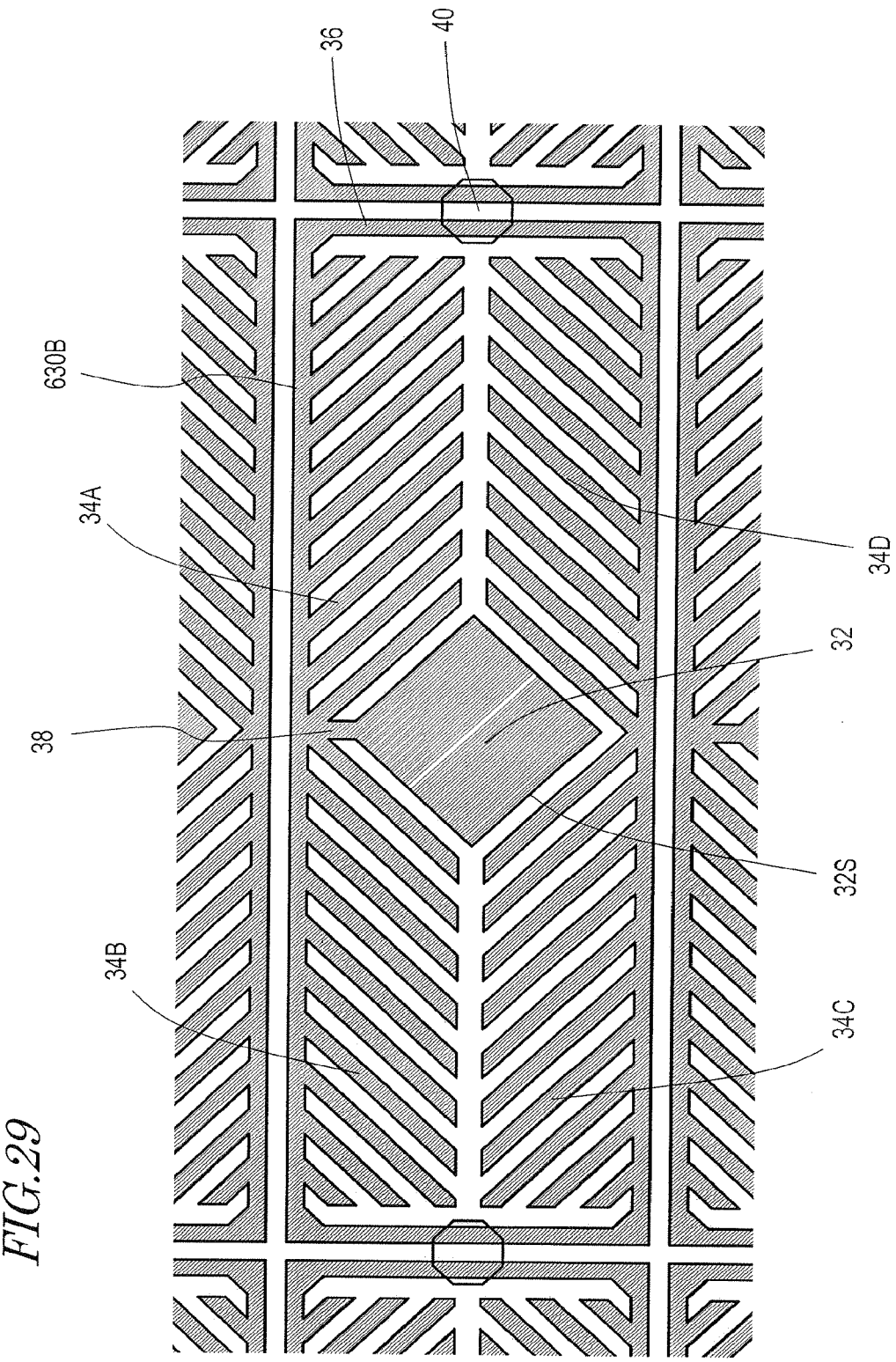
FIG. 29 is a plan view showing a shape of a pixel electrode 630B in a modification in Embodiment 6.

By contrast, the island portion 32 may be formed to be larger. FIG. 29 is a plan view showing a shape of a pixel electrode 630B in a modification of Embodiment 6. The island portion 32 of the pixel electrode 630B is larger than the island portion 32 of the pixel electrode 630 described above. Each of straight line portions of the outer edge 32S of the island portion 32 of the pixel electrode 630B has a length of 31 μm. This structure allows an alignment margin of the island portion 32 for the contact hole 42 to be larger. Therefore, during the formation of the island portion 32 by photolithography, a situation is avoided that a layer below the contact hole 42 (e.g., drain electrode layer) cannot be sufficiently covered with a resist material used for patterning for forming the island portion 32 and thus is exposed, resulting in being exposed to an etching solution. Since such a situation is avoided, reduction of the production yield or the like can be suppressed.

Figure 28:
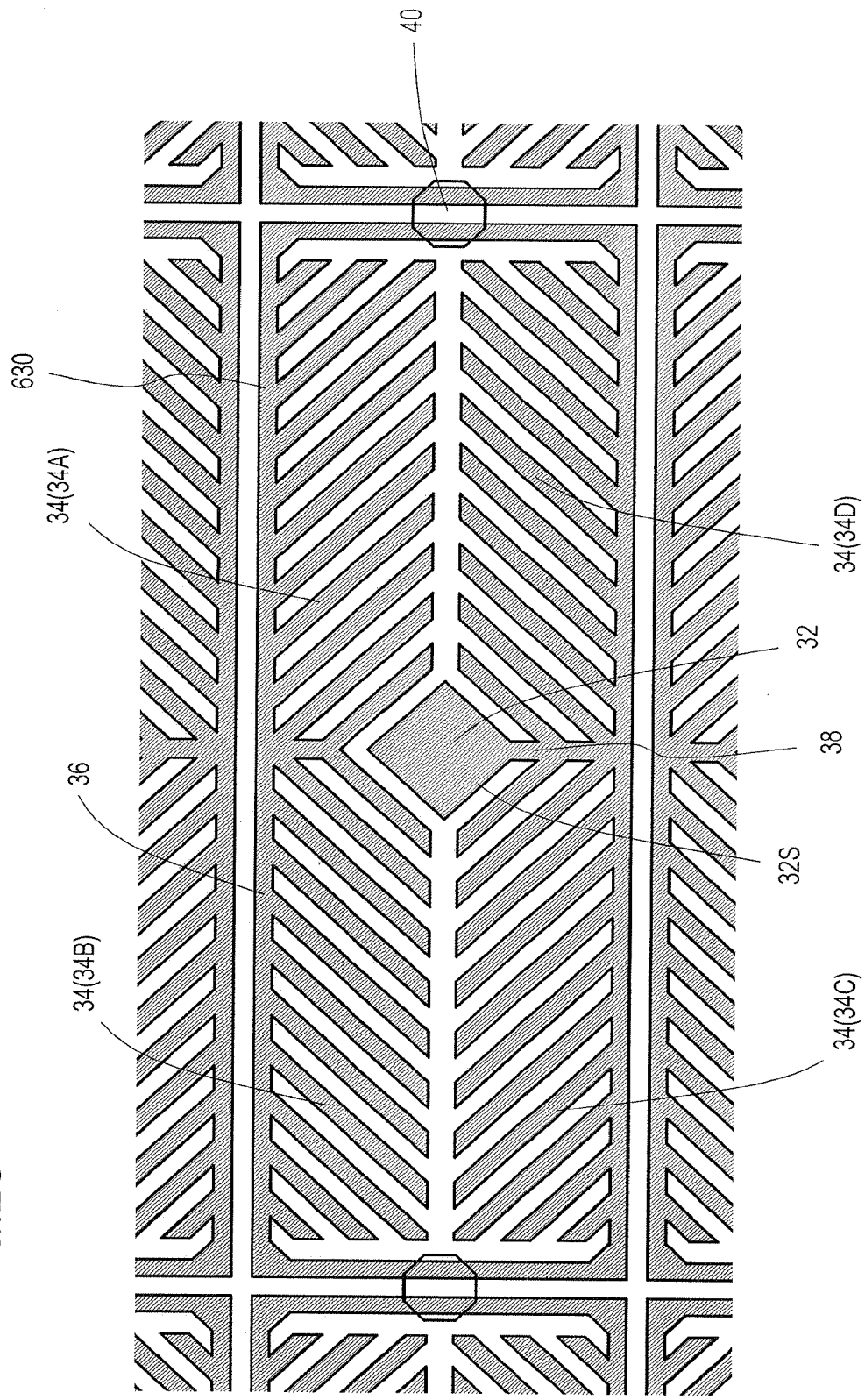
FIG. 28 is a plan view showing a shape of a pixel electrode 630 in Embodiment 6.

With the structure shown in FIG. 28, the shortest distance between the outer edge 32S of the island portion 32 and the contact hole 42 is 2.6 μm. By contrast, with the structure shown in FIG. 29, the shortest distance is 9.2 μm. The contact hole 42 may be formed to be larger. In such a case, even where the interlayer insulating film 44 is thicker than 3.0 μm, the above-mentioned fault which can occur during the photolithography can be suppressed.

In a comparison conducted by use of 4.3-type liquid crystal display devices, a liquid crystal display device using the pixel electrode 630 including the smaller island portion 32 provided display having a transmittance 10% higher and less coarseness than a liquid crystal display device using the pixel electrode 630B having the larger island portion 32.

The line configuration of this embodiment is the same as that of Embodiment 5 and thus is not described. Any of the line configurations and any of the location arrangements of the spacers 40 described in Embodiments 1 through 4 may be applied to this embodiment.

Embodiment 7

Figure 31:
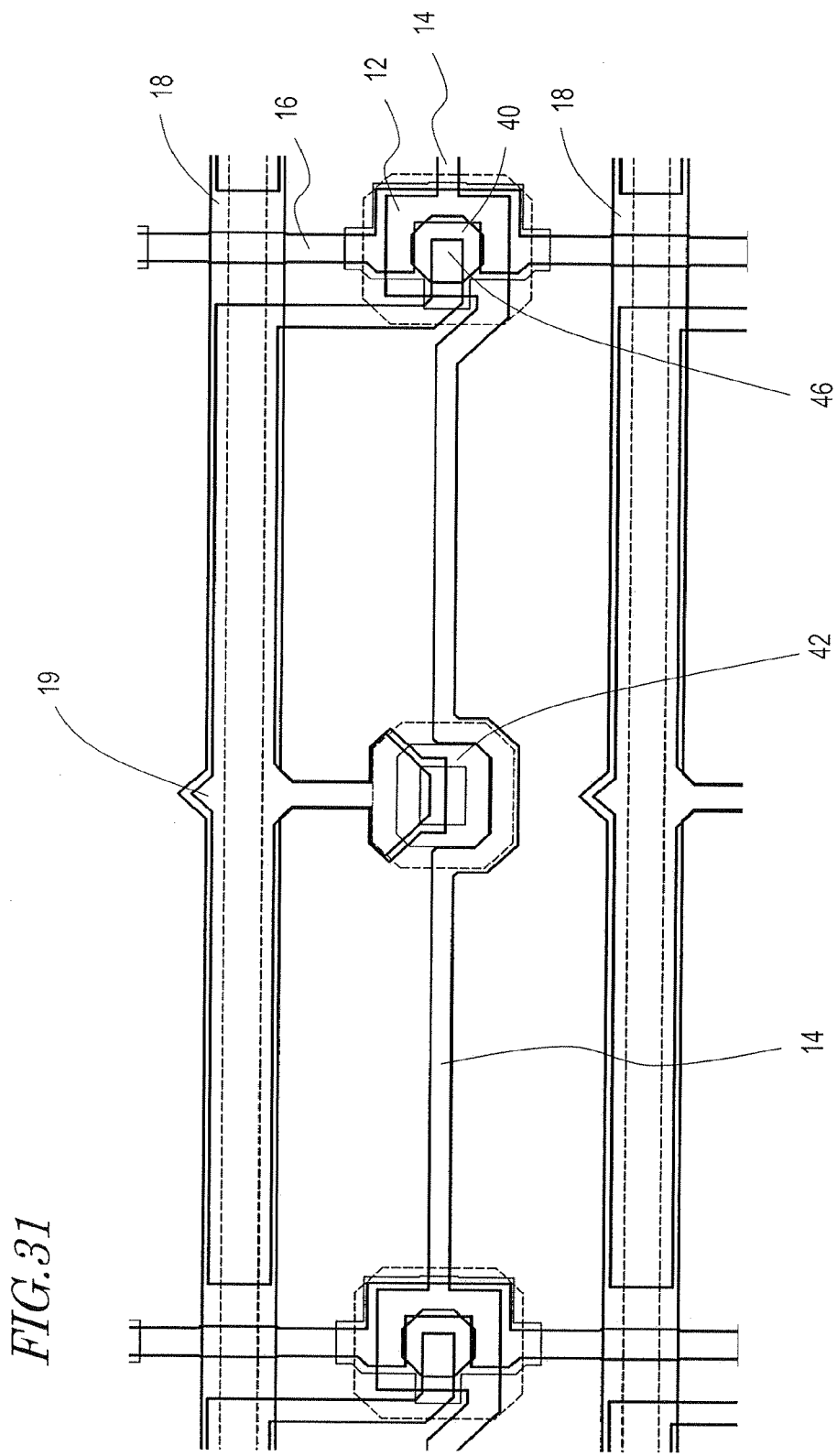
FIG. 31 is a plan view showing a line configuration of the pixel 50 in Embodiment 7.
Figure 32:
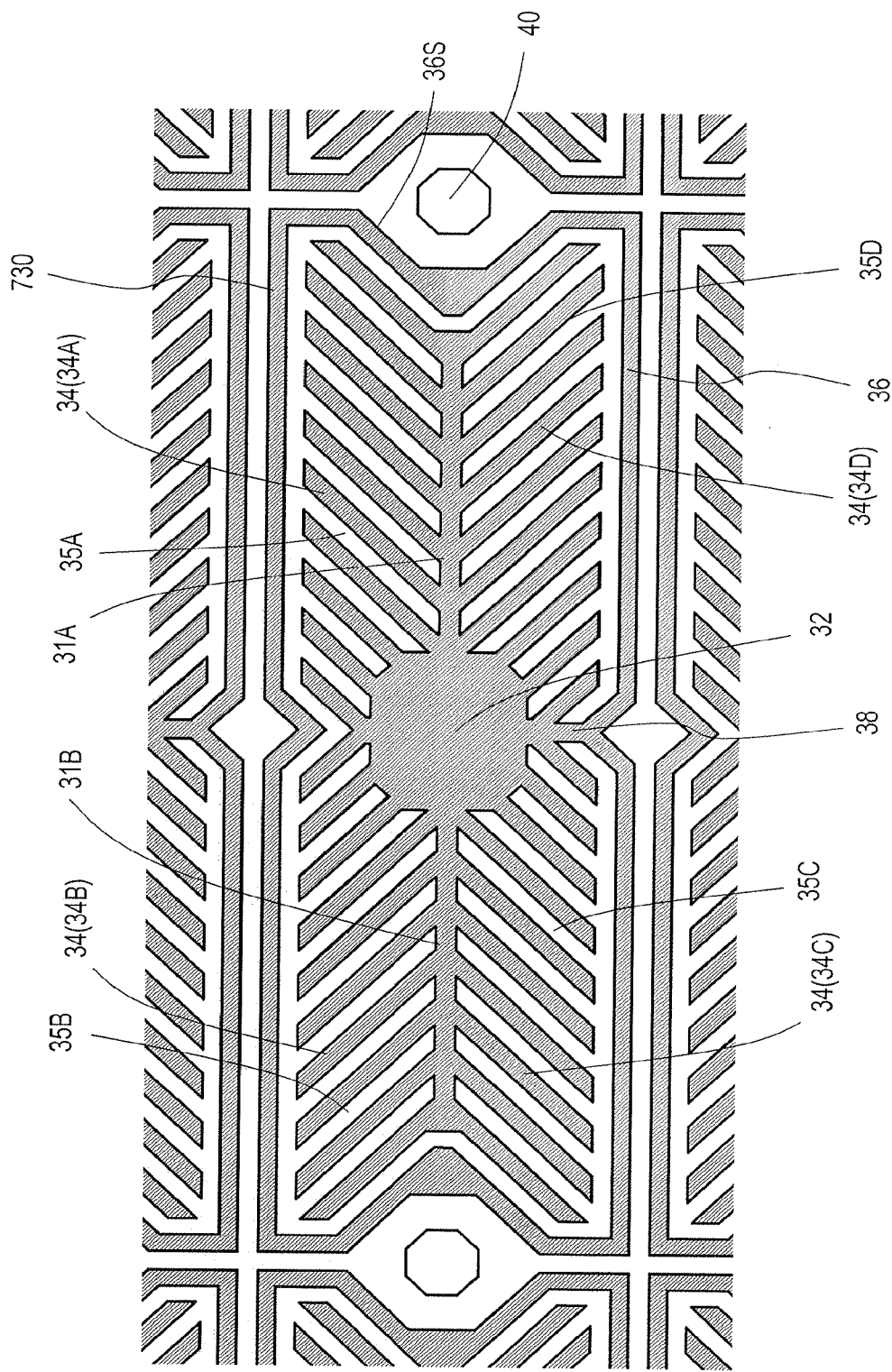
FIG. 32 is a plan view showing a shape of a pixel electrode 730 in Embodiment 7.
Figure 33:
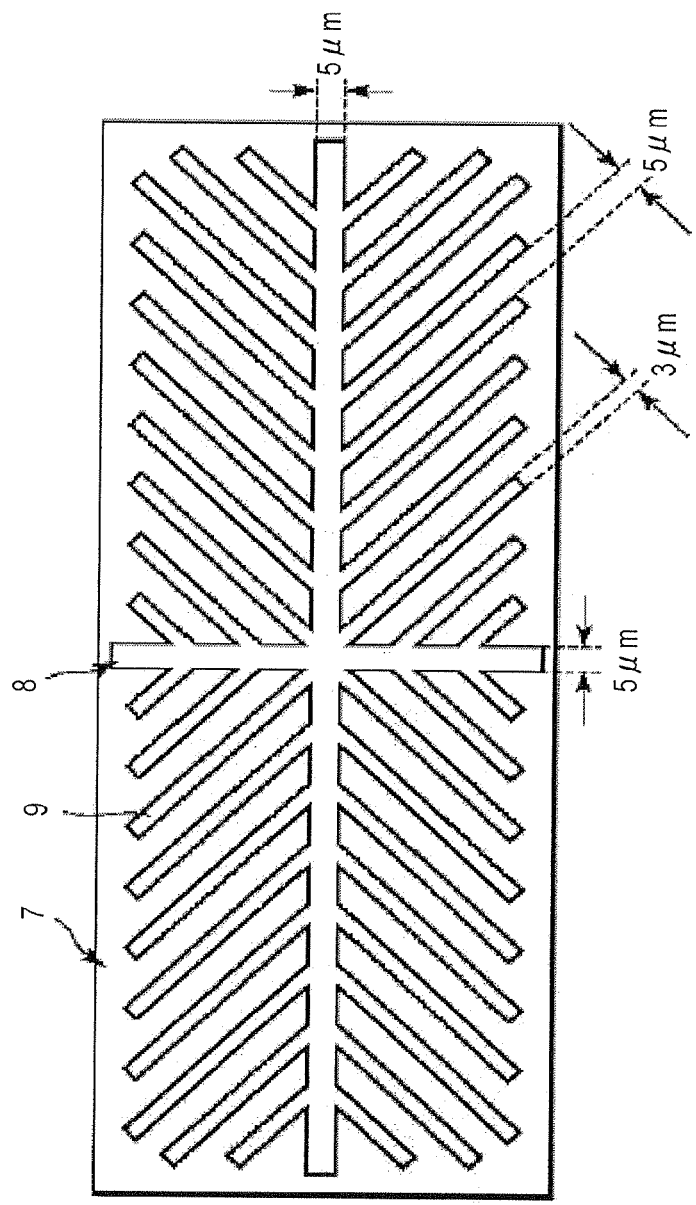
FIG. 33 is a plan view showing a shape of a fishbone-type pixel electrode 7 of a liquid crystal display device described in Patent Document 2.

Now, with reference to FIG. 30 through FIG. 32, a liquid crystal display device 100 in Embodiment 7 according to the present invention will be described.

Figure 30:
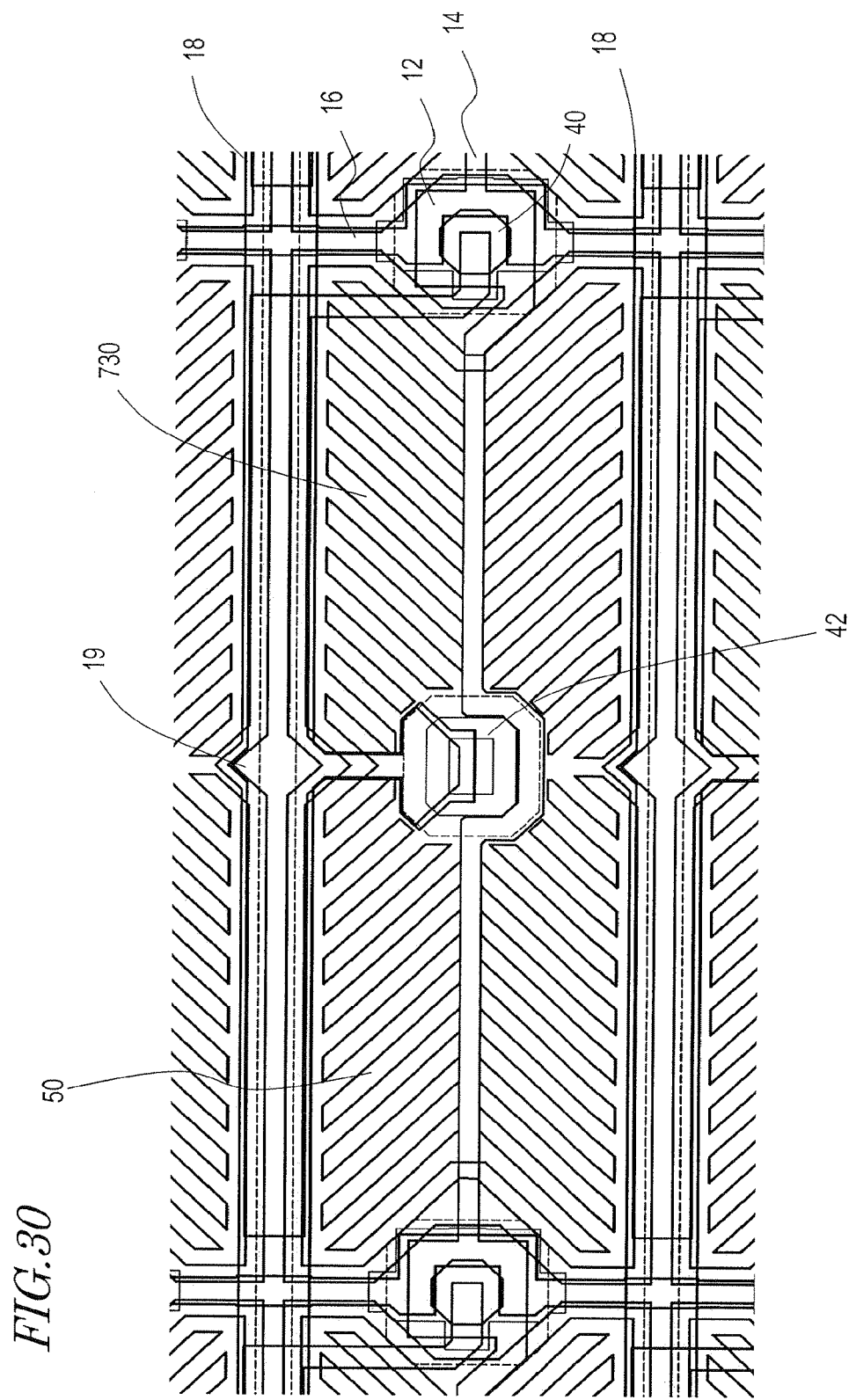
FIG. 30 is a plan view showing a structure of a pixel 50 of a liquid crystal display device 100 in Embodiment 7 according to the present invention.

FIG. 30 is a plan view showing a structure of a pixel 50 of the liquid crystal display device 100 in Embodiment 7. FIG. 31 is a plan view showing a line configuration of the pixel 50 in Embodiment 7. FIG. 32 is a plan view showing a shape of a pixel electrode 730 in Embodiment 7.

The pixel electrode 730 includes a peripheral portion 36, an island portion 32, trunk portions 31A and 31B extending in directions of 0° and 180° from the island portion 32, and a plurality of branch portions 34 extending from the trunk portion 31A or 31B or from the island portion 32. The plurality of branch portions 34 are formed of a plurality of first branch portions 34A extending in a direction of 45°, a plurality of second branch portions 34B extending in a direction of 135°, a plurality of third branch portions 34C extending in a direction of 225°, and a plurality of fourth branch portions 34D extending in a direction of 315°.

When a voltage is applied to the liquid crystal molecules 52, four alignment domains 35A, 35B, 35C and 35D are formed by the first branch portions 34A, the second branch portions 34B, the third branch portions 34C and the fourth branch portions 34D.

None of ends of the plurality of branch portions 34 is connected to the peripheral portion 36, and there is a gap (insulating portion) therebetween. The island portion 32 is connected to the peripheral portion 36 by a connection portion 38 but not by any of the plurality of branch portions 34. When seen in the Z direction, the island portion 32 is surrounded by the first through fourth regions 35A through 35D.

In the vicinity of the spacers 40, the peripheral portion 36 is bent along the shape of the corresponding spacer 40 and includes a plurality of portions 36S each extending perpendicularly to the direction in which the corresponding branch portions 34 extend. Since there is a gap between each spacer 40 and the peripheral portion 36, the alignment disturbance of the liquid crystal molecules is suppressed from being conveyed to the liquid crystal molecules on the pixel electrode 30.

The line configuration of this embodiment is the same as that of Embodiment 5 and the location arrangement of the spacers 40 are the same as those of Embodiment 3, and thus these are not described. Any of the line configurations described in Embodiments 1 through 4, and any of the location arrangements of the spacers 40 described in Embodiments 1 and 2 may be applied to this embodiment.

INDUSTRIAL APPLICABILITY

The present invention is usable for improving the display characteristics of a vertical alignment type liquid crystal display device.

REFERENCE SIGNS LIST

7 Pixel electrode
8 Branch slit

9 Trunk slit
10 TFT substrate
11 Black matrix (BM)
12 TFT
13 Color filter
14 Scanning line
15 Gate insulating film
16 Signal line
17 Semiconductor layer
18 Storage capacitance line
19 Storage capacitance counter electrode
20 Counter substrate
21 Liquid crystal layer
22 Scanning line driving circuit
23 Signal line driving circuit
24 Control circuit
25 Common electrode (counter electrode)
26, 27 Polarizing plate
28 Backlight unit
30, 230, 330, 430, 630, 730 Pixel electrode
30A, 30B, 30C, 330B, 630B Pixel electrode in a modification
31A First trunk portion
31B Second trunk portion
32 Island portion
32A Outer edge (edge of the island portion)
34 Branch portion
34A-34D First through fourth branch portions
35A-35D Alignment domains (first through fourth regions)
36 Peripheral portion
36S Portion of the peripheral portion
36E Corner (corner of the peripheral portion)
38 Connection portion
40 Spacer
42 Contact hole
43 Protective insulating film
44 Interlayer insulating film (insulating layer)
46 Drain electrode
48, 49 Absorption axis
50 Pixel
52 Liquid crystal molecules
100 Liquid crystal display device

The invention claimed is:

1. A liquid crystal display device including a plurality of pixels arrayed in a matrix, the liquid crystal display device comprising:
a TFT substrate including pixel electrodes respectively provided in correspondence with the plurality of pixels, TFTs respectively provided in correspondence with the plurality of pixels, and an insulating layer comprising contact holes formed therein for electrically connecting drain electrodes of the TFTs to the pixel electrodes;
a counter substrate including a counter electrode facing the pixel electrodes;
a liquid crystal layer located between the TFT substrate and the counter substrate, the liquid crystal layer containing liquid crystal molecules having a negative dielectric anisotropy; and
at least one spacer located between the TFT substrate and the counter substrate;
wherein:
the pixel electrodes each include a peripheral portion, an island portion including a portion which electrically contacts the drain electrode in the contact hole, and a plurality of branch portions extending from the peripheral portion, wherein said island portion when viewed from above has no apertures defined therein and is generally round in shape and has length and width values greater than a width of respective branch portions;
the plurality of branch portions include a plurality of first branch portions extending in a first direction, a plurality of second branch portions extending in a second direction, a plurality of third branch portions extending in a third direction, and a plurality of fourth branch portions extending in a fourth direction;
the first direction, the second direction, the third direction and the fourth direction are different from each other;
a first region in which the liquid crystal molecules are aligned along the first branch portions at the time of voltage application, a second region in which the liquid crystal molecules are aligned along the second branch portions at the time of voltage application, a third region in which the liquid crystal molecules are aligned along the third branch portions at the time of voltage application, and a fourth region in which the liquid crystal molecules are aligned along the fourth branch portions at the time of voltage application are formed by the first branch portions, the second branch portions, the third branch portions and the fourth branch portions; and
wherein the island portion is provided at part of the peripheral portion so that the island portion defines part of the peripheral portion.

2. The liquid crystal display device of claim 1, further comprising a first polarizing plate and a second polarizing plate located so as to hold the liquid crystal layer therebetween; wherein an absorption axis of the first polarizing plate and an absorption axis of the second polarizing plate cross each other perpendicularly, and the first direction, the second direction, the third direction and the fourth direction are each different by substantially 45° from the absorption axis of the first polarizing plate or the second polarizing plate.

3. The liquid crystal display device of claim 1, wherein each of the TFT substrate and the counter substrate includes an alignment sustaining layer that provides the liquid crystal molecules with a pretilt in the absence of a voltage.

4. The liquid crystal display device of claim 1, wherein the TFT substrate includes a storage capacitance line located at boundaries among the first region, the second region, the third region, and the fourth region.

5. The liquid crystal display device of claim 1, wherein at least one corner located in the vicinity of the at least one spacer among four corners of the pixel electrode is recessed inward.

6. The liquid crystal display device of claim 1, wherein said at least one spacer comprises a plurality of spacers respectively located proximate at least one corner of each of the plurality of pixel electrodes when viewed from above the TFT substrate.

7. The liquid crystal display device of claim 1, wherein for each of the pixel electrodes' the island portion is located at a center of one side of the pixel electrode.

8. The liquid crystal display device of claim 7, wherein in each of the plurality of pixels a corresponding one of the contact holes is located at a center of one side of the pixel electrode.

9. The liquid crystal display device of claim 1, wherein, for each of the pixel electrodes, the first, second, third and fourth directions define an angle other than 0 degrees and other than 90 degrees with each of four major sides of the pixel electrode.

10. A liquid crystal display device including a plurality of pixels arrayed in a matrix, the liquid crystal display device comprising:
- a TFT substrate including pixel electrodes respectively provided in correspondence with the plurality of pixels, TFTs respectively provided in correspondence with the plurality of pixels, and an insulating layer comprising contact holes formed therein for electrically connecting drain electrodes of the TFTs to the pixel electrodes;
- a counter substrate including a counter electrode facing the pixel electrodes;
- a liquid crystal layer located between the TFT substrate and the counter substrate, the liquid crystal layer containing liquid crystal molecules having a negative dielectric anisotropy; and
- at least one spacer located between the TFT substrate and the counter substrate;

wherein:
the pixel electrodes each include a peripheral portion, an island portion including a portion which electrically contacts the drain electrode in the contact hole, and a plurality of branch portions extending from the peripheral portion, wherein said island portion when viewed from above has no apertures defined therein and is generally round in shape and has length and width values greater than a width of respective branch portions;
the plurality of branch portions include a plurality of first branch portions extending in a first direction, a plurality of second branch portions extending in a second direction, a plurality of third branch portions extending in a third direction, and a plurality of fourth branch portions extending in a fourth direction;
the first direction, the second direction, the third direction and the fourth direction are different from each other;
a first region in which the liquid crystal molecules are aligned along the first branch portions at the time of voltage application, a second region in which the liquid crystal molecules are aligned along the second branch portions at the time of voltage application, a third region in which the liquid crystal molecules are aligned along the third branch portions at the time of voltage application, and a fourth region in which the liquid crystal molecules are aligned along the fourth branch portions at the time of voltage application are formed by the first branch portions, the second branch portions, the third branch portions and the fourth branch portions;
wherein the island portion is provided at part of the peripheral portion so that the island portion defines part of the peripheral portion; and
wherein in each of the plurality of pixels a corresponding one of the contact holes is located at a center of one side of the pixel electrode.

* * * * *